(12) United States Patent
Ramsey

(10) Patent No.: US 7,731,211 B2
(45) Date of Patent: Jun. 8, 2010

(54) HEAVY-DUTY VEHICLE AXLE/SUSPENSION SYSTEM

(75) Inventor: John Edward Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 138 days.

(21) Appl. No.: 11/413,428

(22) Filed: Apr. 28, 2006

(65) Prior Publication Data

US 2006/0244234 A1 Nov. 2, 2006

Related U.S. Application Data

(60) Provisional application No. 60/676,554, filed on Apr. 29, 2005.

(51) Int. Cl.
*B60G 3/16* (2006.01)

(52) U.S. Cl. ..................... 280/124.131; 280/124.116; 280/124.157

(58) Field of Classification Search .......... 280/124.116, 280/124.117, 124.151, 124.157, 124.131
See application file for complete search history.

(56) References Cited

U.S. PATENT DOCUMENTS

| | | | |
|---|---|---|---|
| 2,971,772 A * | 2/1961 | Tantlinger et al. ......... | 280/86.75 |
| 3,140,880 A * | 7/1964 | Masser ................ | 280/124.108 |
| 3,895,819 A | 7/1975 | Willetts | |
| 3,964,764 A * | 6/1976 | Rickardsson ......... | 280/124.116 |
| 4,134,604 A | 1/1979 | Jackson et al. | |
| 4,166,640 A * | 9/1979 | Van Denberg ....... | 280/124.116 |
| 4,313,618 A | 2/1982 | Robinson | |
| 4,334,696 A * | 6/1982 | Bergstrom ........... | 280/124.104 |
| 4,889,361 A * | 12/1989 | Booher ................ | 280/124.175 |
| 5,046,752 A * | 9/1991 | Stephens et al. ............ | 280/678 |

(Continued)

FOREIGN PATENT DOCUMENTS

EP 0243191 B1 10/1987

(Continued)

OTHER PUBLICATIONS

Photograph of a trailing arm air suspension with a composite beam bolted to the axle, manufactured by BPW Bergische Achsen KG, which is located in Germany. Photograph was taken in about Nov. 2003.

(Continued)

*Primary Examiner*—Paul N Dickson
*Assistant Examiner*—Timothy D Wilhelm
(74) *Attorney, Agent, or Firm*—Krugliak, Wilkins, Griffiths & Dougherty Co., LPA; David P. Dureska; Edward T. Kennedy

(57) ABSTRACT

An axle/suspension system for a heavy-duty vehicle, in which the vehicle includes a frame that extends in a longitudinal direction relative to the vehicle. The axle/suspension system is attached to the vehicle frame via at least one hanger and includes at least one beam, which includes a first end and a second end. The first end of the beam is connected to the hanger, and the second end of the beam immovably captures an axle, which extends in a transverse direction relative to the vehicle. The beam is formed of a composite material and has a substantially constant cross section in the transverse direction to provide sufficient strength to control roll forces encountered by the vehicle during operation.

14 Claims, 17 Drawing Sheets

U.S. PATENT DOCUMENTS

| | | | | |
|---|---|---|---|---|
| 5,171,036 | A * | 12/1992 | Ross | 280/124.116 |
| 5,301,931 | A * | 4/1994 | Bigo | 267/5 |
| 5,346,247 | A * | 9/1994 | Snyder | 280/124.116 |
| 5,478,104 | A * | 12/1995 | Worrel et al. | 280/124.17 |
| 5,509,684 | A * | 4/1996 | Yarrow et al. | 280/124.17 |
| 5,788,263 | A | 8/1998 | Vandenberg et al. | |
| 6,056,305 | A * | 5/2000 | Pribyl | 280/124.157 |
| 6,158,773 | A | 12/2000 | Verhaeghe | |
| 6,286,857 | B1 * | 9/2001 | Reese et al. | 280/683 |
| 6,324,940 | B1 * | 12/2001 | Pazdirek et al. | 74/579 R |
| 6,543,857 | B1 | 4/2003 | Griffiths et al. | |
| 6,607,205 | B2 * | 8/2003 | Platner | 280/124.116 |
| 6,634,673 | B1 | 10/2003 | Verhaeghe | |
| 6,991,223 | B2 * | 1/2006 | Platner et al. | 267/47 |
| 7,144,022 | B2 * | 12/2006 | Bordini | 280/124.109 |
| 7,296,809 | B2 * | 11/2007 | Zebolsky | 280/86.75 |
| 2003/0001376 | A1 * | 1/2003 | Verhaeghe | 280/781 |
| 2003/0067134 | A1 * | 4/2003 | Galazin | 280/124.116 |
| 2003/0184074 | A1 | 10/2003 | Verhaeghe | |
| 2004/0084822 | A1 * | 5/2004 | Collyer et al. | 267/293 |
| 2004/0256820 | A1 | 12/2004 | Chalin et al. | |
| 2004/0256829 | A1 * | 12/2004 | Chalin et al. | 280/124.116 |
| 2005/0006869 | A1 * | 1/2005 | Hughes | 280/124.128 |
| 2005/0057014 | A1 * | 3/2005 | Ramsey | 280/124.116 |
| 2005/0134016 | A1 * | 6/2005 | Huprikar | 280/124.116 |
| 2005/0218620 | A1 * | 10/2005 | Reineck | 280/124.116 |
| 2006/0181044 | A1 * | 8/2006 | Zebolsky | 280/86.75 |
| 2006/0249923 | A1 * | 11/2006 | Ramsey | 280/124.131 |
| 2007/0145705 | A1 * | 6/2007 | Ramsey et al. | 280/124.128 |

FOREIGN PATENT DOCUMENTS

| | | |
|---|---|---|
| EP | 0152914 B1 | 10/1989 |
| EP | 0650860 B1 | 8/1997 |
| GB | 2147254 A | 5/1985 |
| JP | 04159110 | 6/1992 |
| WO | 8600266 | 1/1986 |
| WO | 8600854 | 2/1986 |
| WO | 8706540 A | 11/1987 |
| WO | 0153779 A | 7/2001 |
| WO | 0242099 A1 | 5/2002 |
| WO | 03093680 A1 | 11/2003 |
| WO | 03097335 A1 | 11/2003 |
| WO | 2004088073 A1 | 10/2004 |
| WO | 2005025900 A1 | 3/2005 |
| WO | 2005037579 A | 4/2005 |

OTHER PUBLICATIONS

DaimlerChrysler brochure entitled "New DCA Trailer Axle System," published in Germany. Date of publication of brochure is uncertain. System believed to be known to the public as of about Apr. 2003.

* cited by examiner

HEAVY-DUTY VEHICLE AXLE/SUSPENSION SYSTEM

CROSS-REFERENCE TO RELATED APPLICATION

This application claims the benefit of U.S. Provisional Patent Application Ser. No. 60/676,554, filed on Apr. 29, 2005.

BACKGROUND OF THE INVENTION

1. Field of the Invention

The present invention relates to the art of axle/suspension systems for vehicles. More particularly, the invention relates to the art of trailing or leading arm air-ride axle/suspension systems for heavy-duty vehicles, such as tractor-trailers or semi-trailers, which cushion the ride and stabilize the vehicle during operation. Still more particularly, the invention relates to the art of trailing or leading arm air-ride axle/suspension systems for heavy-duty vehicles of the type that may be susceptible to roll forces and dock walk.

2. Background Art

Heavy-duty vehicles that transport freight, for example, tractor-trailers or semi-trailers and straight trucks, typically include leading or trailing arm air-ride suspension assemblies that connect the axles of the vehicle to the frame of the vehicle. These air-ride suspension assemblies use air springs to cushion the ride of the vehicle. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to a slider box, with the understanding that such reference is by way of example, and that the present invention applies to heavy-duty vehicle primary frames, movable subframes and non-movable subframes.

In the heavy-duty vehicle art, one or more axle/suspension systems usually are suspended from a single slider box. It is understood that a slider box outfitted with usually two axle/suspension systems typically is referred to as a slider tandem, and for purposes of convenience and clarity, will hereinafter be referred to as a slider tandem. Of course, a slider box may also be outfitted with a single axle/suspension system, or three or more axle/suspension systems. By way of example, reference herein shall be made to a slider tandem having a pair of axle/suspension systems mounted thereon, with the understanding that such reference also applies to a slider outfitted with one, three or more axle/suspension systems. The slider tandem in turn is mounted on the underside of the trailer primary frame, and is movable longitudinally therealong to provide a means for variable load distribution and vehicular maneuverability.

More specifically, the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. A trailer having a slider tandem gains an advantage with respect to laws governing maximum axle loads. More particularly, proper placement of the slider tandem varies individual axle loads or redistributes the trailer load so that it is within legal limits.

A slider box or other subframe typically includes a pair of longitudinally-extending, parallel, transversely-spaced elongated main members. A plurality of longitudinally-spaced parallel cross members extend transversely between and are attached to the main members. Pairs of transversely-spaced hangers are mounted on and depend from the main members and selected ones of the cross members. An axle/suspension system typically includes a pair of transversely-spaced trailing arm beams, each of which is pivotally connected at its front end to a respective one of the hangers. Each trailing arm beam also is welded or otherwise rigidly attached at its rear end to a transversely-extending axle of the axle/suspension system. The wheels of the vehicle are rotationally mounted, as known in the art, to opposing ends of the axle. The axle/suspension system further conventionally includes a pair of air springs, which each extend between and are mounted on the rear end of a respective one of the beams and a respective one of the main members, and a pair of shock absorbers, which each extend between and are mounted on a respective one of the beams and a respective one of the main members. It should be noted that, while the hangers are sometimes considered to be part of the vehicle frame once they are connected to the frame members, they are typically engineered as part of the axle/suspension system.

The axle/suspension system of the heavy-duty vehicle also acts to cushion the ride and stabilize the vehicle. More particularly, as the vehicle is traveling over-the-road, its wheels encounter road conditions that impart various forces, loads and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to absorb at least some of them.

These forces include vertical forces caused by vertical movement of the wheels as they encounter certain road conditions, fore-aft forces caused by acceleration and deceleration of the vehicle, and side-load and roll forces associated with transverse vehicle movement, such as turning of the vehicle and lane-change maneuvers. In order to address such disparate forces, axle/suspension systems have differing structural requirements. More particularly, it is desirable for an axle/suspension to be fairly stiff or rigid to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure. In order to resolve these differing structural requirements, prior art axle/suspension systems include undesirable excessive weight and cost, as will be described in detail below.

In addition, it is desirable for trailing arm axle/suspension systems to reduce or prevent an event known as "dock walk," reduction of which typically has been achieved through the use of pivoted links and/or other components. More particularly, many heavy-duty vehicles transport dry freight, that is, cargo that is loaded into a van or trailer of a typical heavy-duty vehicle. To receive cargo, or to have it removed, the vehicle often parks at a loading dock, with a rear end of the trailer in close proximity to the dock. Due to the weight of the cargo, a fork lift or other transfer vehicle is used to load the cargo into or unload the cargo from the trailer, and travels from the loading dock into the trailer. At this stage of the loading or unloading process, a disadvantage of many prior art axle/suspension systems occurs, which is an event known in the art as "dock walk." The dock walk event will be described in greater detail below, but may be summarized as a generally arcuate motion of the rigid trailing arm beam and axle of the axle/suspension system in response to the sudden weight increase of the fork lift driving into the trailer, which causes the vehicle tires to rotate in a forward direction and undesirably move the trailer away from the loading dock.

In an attempt to reduce or prevent dock walk in prior art rigid-beam leading or trailing arm air-ride axle/suspension systems, additional components have been used to reduce the arcuate motion of the trailing arm beam when a forklift or other device is introduced into the trailer during a loading or unloading situation. For example, some systems employ a mechanical stop or similar structural component, as will be described in greater detail below, which reduces arcuate motion of the beam and the axle, and in turn reduces the rotation of the tires, which minimizes dock walk. Other systems employ manual exhaust valves, which will also be described in greater detail below, which enable bumpers within the air springs to act as a positive mechanical support and minimize arcuate motion of the beam and the axle, in turn minimizing forward rotation of the tires and dock walk.

However, components such as a structural stop and/or exhaust valves, as well as associated components for the operation and control of the stop and/or valves, involve an undesirable increase in weight of the axle/suspension system, as well as an undesirable increase in cost for the system. Moreover, such additional components add to the complexity of the axle/suspension system, undesirably increasing maintenance costs for the system.

Other types of prior art air-ride axle/suspension systems that are known in the art also reduce or prevent dock walk, such as parallelogram linkages in which each beam is made up of links that are pivotally attached to the frame hanger and the axle, as will be described in greater detail below. However, such prior art parallelogram linkage axle/suspension systems possess a distinct disadvantage, which is a lack of stiffness or rigidity that creates an inherent lack of roll stability. In order to provide stability, an auxiliary roll bar assembly must be incorporated into the parallelogram linkage system, which involves the addition of multiple components and thereby undesirably increases the weight, complexity, cost and maintenance of the system.

Other types of prior art axle/suspension systems, which are known in the art as mechanical spring suspension systems, typically are not subject to dock walk. Spring suspension systems, however, are not air-ride systems, and instead include a pairs of transversely-spaced leaf springs. These leaf springs are engineered to carry the vertical load of the vehicle, and therefore typically are stiff enough to control roll forces. The stiffness of the leaf springs of the spring suspension creates a significant disadvantage for the suspension, since the leaf springs must be engineered to be stiff enough to provide vertical force resistance and thus roll stability for a fully-loaded trailer, which sacrifices flexibility in situations where the trailer is only lightly loaded, thereby creating an extremely harsh ride when the trailer is lightly loaded. Thus, the ride that is enabled by a spring suspension is considerably less than optimum.

Therefore, in the prior art, the competing demands of stiffness or rigidity for roll stability, flexibility for compliance and dampening of vertical forces, and/or movable attachment of beams or links to the frame hangers and/or the axle for reduction of dock walk, have led to axle/suspension systems that provide less-than-optimum reaction of forces, and which are undesirably heavy and expensive. As a result, a need has existed in the art to develop a leading or trailing arm air-ride axle/suspension system that overcomes the disadvantages of prior art systems and provides a relatively lightweight, simple and economical system that can provide vehicle roll stability while potentially reducing or eliminating dock walk.

BRIEF SUMMARY OF THE INVENTION

An objective of the present invention is to provide an axle/suspension system for a heavy-duty vehicle that is relatively simple, lightweight and cost efficient as compared to prior art systems.

Another objective of the present invention is to provide an axle/suspension system for a heavy-duty vehicle that provides roll stability.

Yet another objective of the present invention is to provide an axle/suspension system for a heavy-duty vehicle that potentially reduces or eliminates dock walk.

Still another objective of the present invention is to provide an axle/suspension system for a heavy-duty vehicle that improves the fatigue life of the system when compared to prior art axle/suspension systems.

These objectives and others are obtained by the axle/suspension system for heavy-duty vehicles of the present invention. The vehicle has a frame that extends in a longitudinal direction relative to the vehicle. The axle/suspension system is attached to the vehicle frame via at least one hanger and includes an axle that extends in a transverse direction relative to the vehicle, and at least one beam. The beam includes a first end and a second end. The first end of the beam is connected to the hanger, and the second end of the beam immovably captures the axle. The beam is formed of a composite material and has a substantially constant cross section in the transverse direction to provide sufficient strength to control roll forces encountered by the vehicle during operation.

BRIEF DESCRIPTION OF THE SEVERAL VIEWS OF THE DRAWINGS

The preferred embodiments of the invention, illustrative of the best mode in which applicant has contemplated applying the principles of the invention, are set forth in the following description and are shown in the drawings, and are particularly and distinctly pointed out and set forth in the appended claims.

Similar numerals refer to similar parts throughout the drawings.

DETAILED DESCRIPTION OF THE INVENTION

Figure 1:
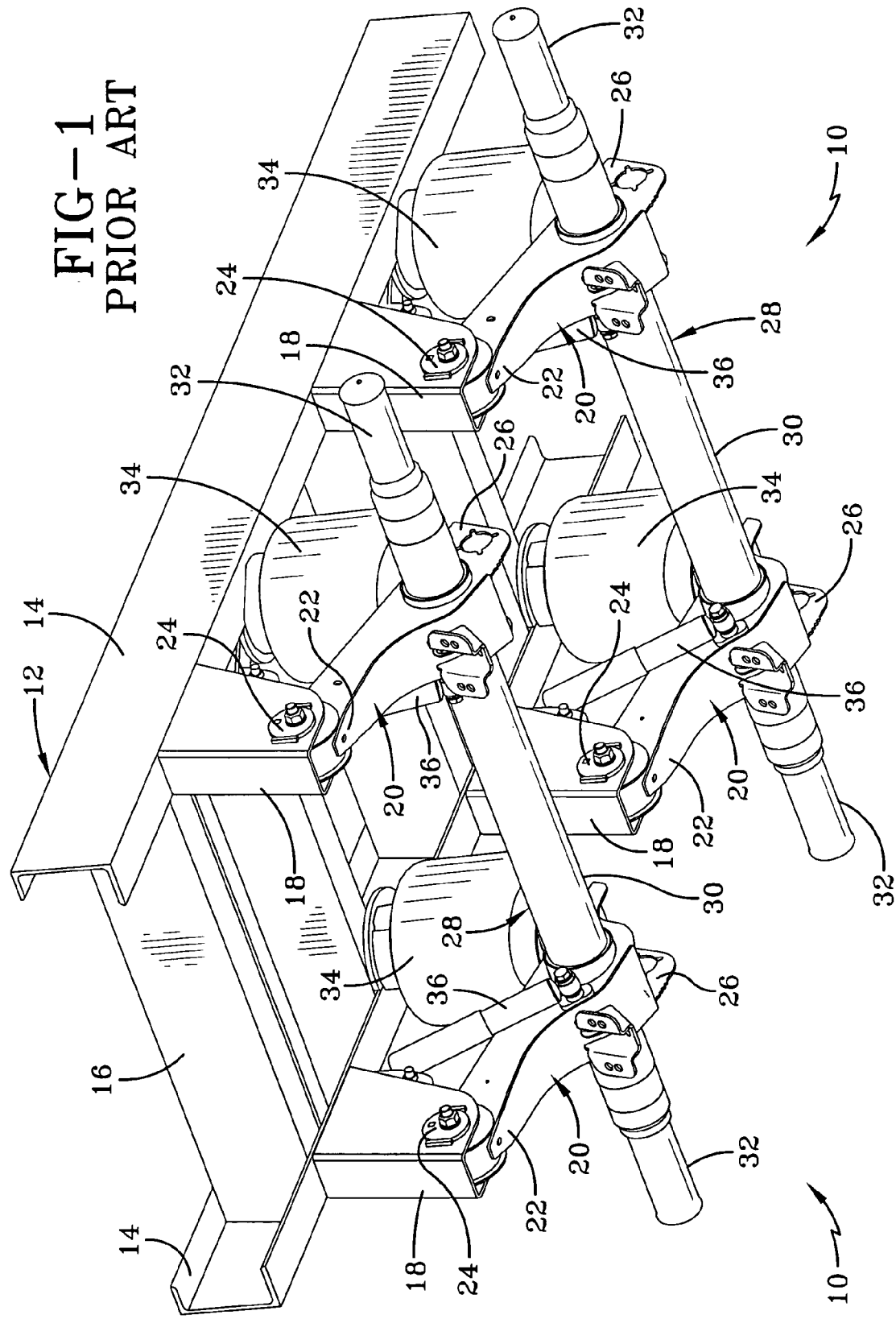
FIG. 1 is a driver's side bottom front perspective view of a prior art slider tandem, including a subframe with depending hangers, shown supporting a pair of axle/suspension systems.
Figure 2:
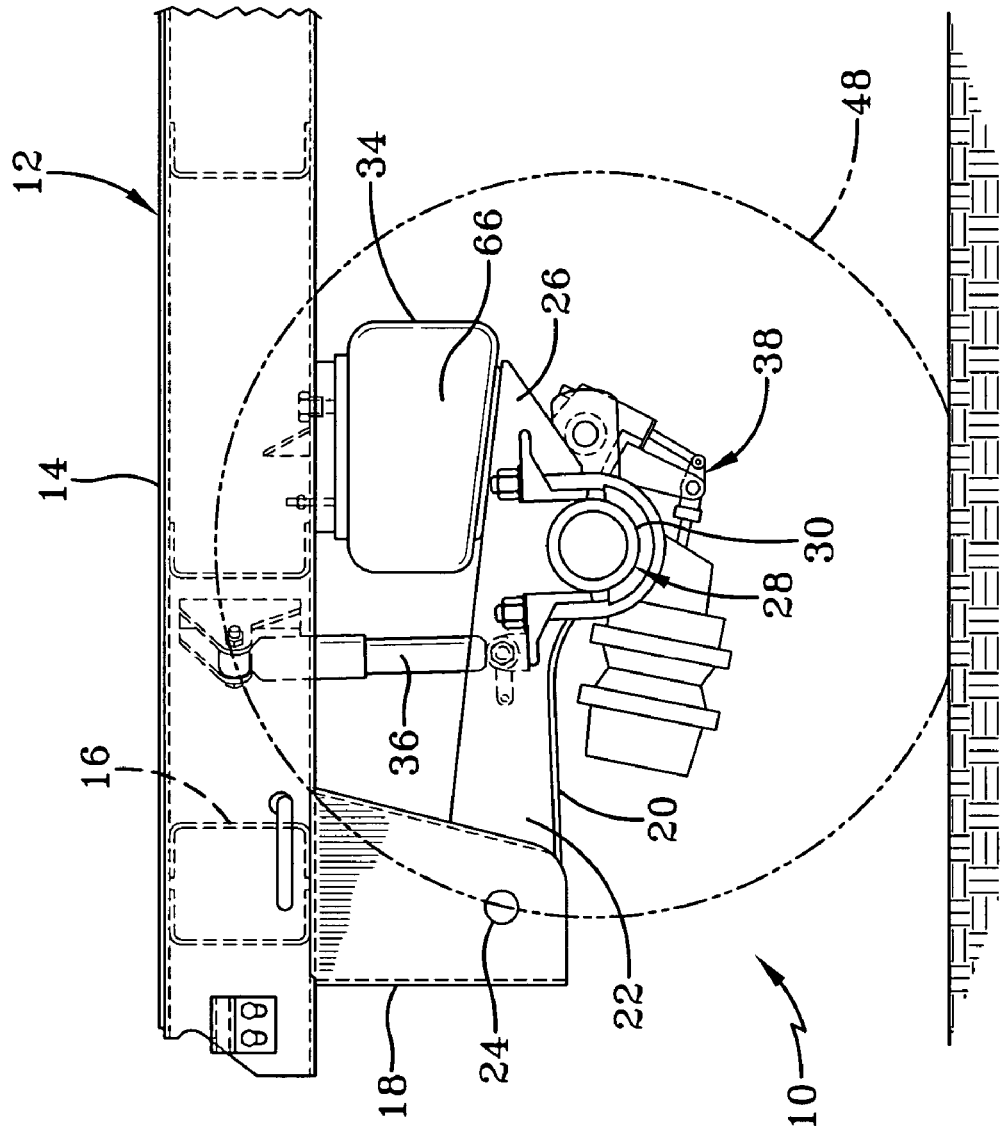
FIG. 2 is a fragmentary side elevational view of the prior art heavy-duty vehicle slider tandem shown in FIG. 1, with hidden components represented by dashed lines, and further showing certain brake system components and a tire, which are represented by dashed lines.

In order to better understand the axle/suspension system of the present invention, a prior art trailing arm type air-ride axle/suspension system, indicated generally at 10, is shown in FIGS. 1 and 2 mounted on a vehicle frame 12, and now will be described. It should be noted that vehicle frame 12 generally is representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. For the purpose of convenience, frame 12 is shown in FIG. 1 as a non-movable subframe.

More specifically, frame 12 includes a pair of elongated, longitudinally-extending, parallel, transversely-spaced main members 14. A plurality of longitudinally-spaced parallel cross members 16 extend transversely between and are attached to main members 14. Pairs of transversely spaced hangers 18 are mounted on and depend from main members 14 and selected ones of cross members 16. It should be noted that, while hangers 18 are sometimes considered to be part of frame 12 once they are connected to main members 14 and selected ones of cross members 16, they are typically engineered as part of axle/suspension system 10.

Axle/suspension system 10 is pivotally connected to hangers 18 via a pair of transversely-spaced trailing arm beams 20. Specifically, each trailing arm beam 20 includes a front end 22 having a bushing assembly 24, which includes a bushing, pivot bolts and washers as is well-known in the art and will be described below, to facilitate pivotal connection of the beam to a respective one of hangers 18. Each beam 20 also includes a rear end 26, which is welded or otherwise rigidly attached to a transversely-extending axle 28. Axle 28 includes a central tube 30 generally extending between beams 20, and a pair of spindles 32 each attached to the central tube and extending outboardly from a respective one of the beams.

Axle/suspension system 10 also includes air springs 34, each of which extends between and is mounted on rear end 26 of a respective one of beams 20 and a respective one of main members 14. A pair of shock absorbers 36, each of which extends between and is mounted on a respective one of beams 20 and a respective one of main frame members 14, also is a component of prior art axle/suspension system 10. For the sake of relative completeness, a brake system 38 (FIG. 2) is shown mounted on prior art axle/suspension system 10.

As mentioned above, axle/suspension system 10 is designed to absorb forces that act on the vehicle as it is operating. More particularly, it is desirable for axle/suspension system 10 to be rigid in order to resist roll forces and thus provide roll stability for the vehicle. This is typically accomplished by using beam 20, which is rigid, and also is rigidly attached to axle 28. It is also desirable, however, for axle/suspension system 10 to be flexible to assist in cushioning vehicle 42 from vertical impacts and to provide compliance so that the axle/suspension system resists failure. Such flexibility typically is sought through the pivotal connection of beam 20 to hanger 18 with bushing assembly 24, which adds undesirable expense to axle/suspension system 10.

Figure 3:
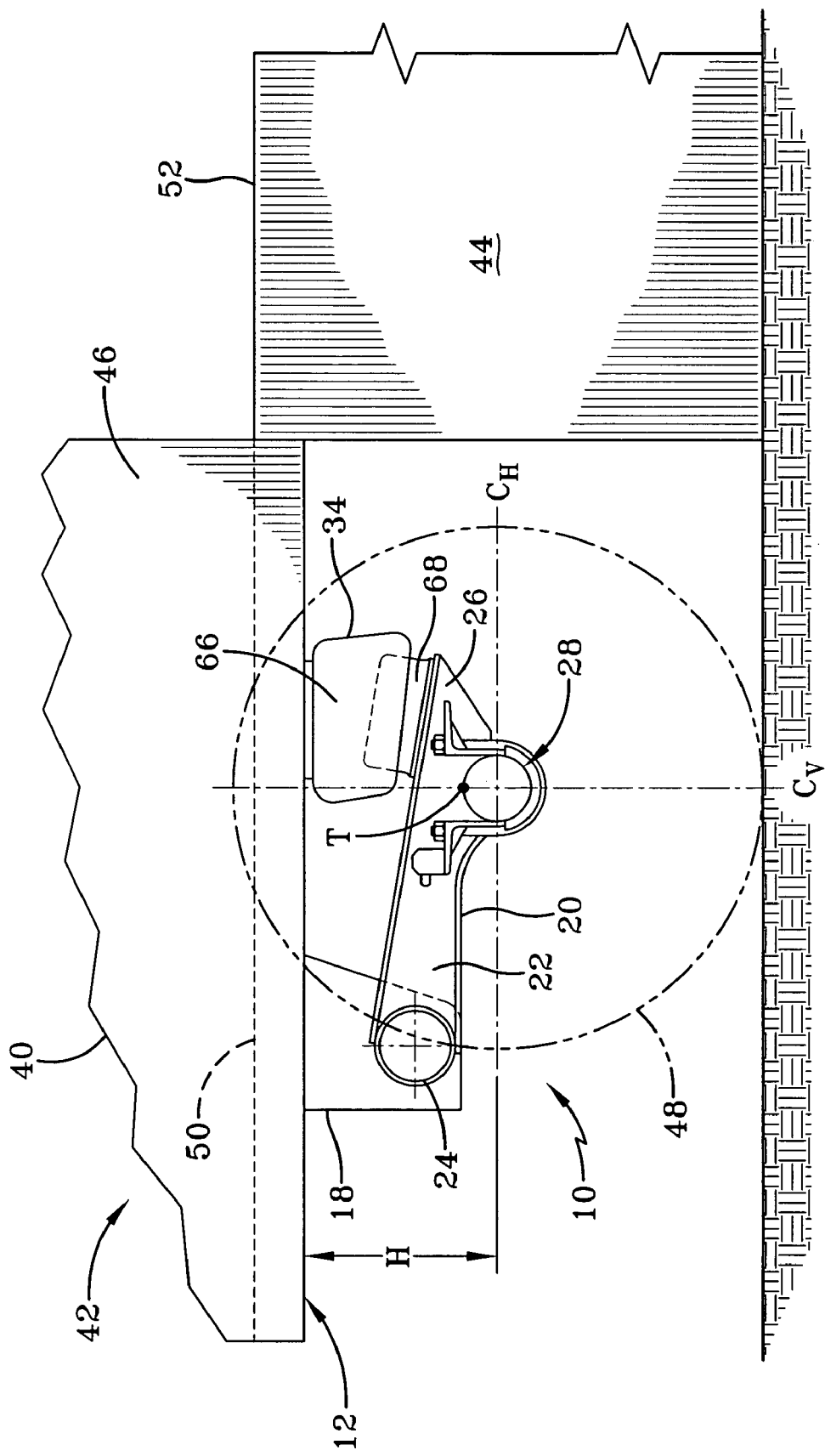
FIG. 3 is a fragmentary schematic representation of a driver's side view of a rear portion of a heavy-duty vehicle parked at a loading dock and having a prior art slider tandem, with hidden components and a vehicle tire represented by dashed lines.

In addition, such a prior-art pivoted connection is undesirably subject to dock walk. With reference now to FIG. 3, many heavy-duty vehicles transport dry freight, that is, cargo that is loaded into a van or trailer 40 of a typical heavy-duty vehicle 42. To receive cargo, or to have it removed, vehicle 42 often parks at a loading dock 44 with a rear end 46 of trailer 40 positioned in close proximity to the dock. Due to the weight of the cargo, a fork lift (not shown) or other transfer vehicle, is used to load the cargo into or unload the cargo from trailer 40, and travels from loading dock 44 into the trailer. It is at this stage of the loading or unloading process that a disadvantage of many prior art axle/suspension systems such as system 10 occurs, which is known in the art as "dock walk."

More specifically, when parking at dock 44, brake system 38 (FIG. 2) of vehicle 42 usually is engaged, thereby preventing tires 48 that are rotatably mounted on axle 28 via bearings (not shown), as known in the art, from spinning on the bearings. Trailer 40 is at an operating height H, measured as the distance from horizontal centerline $C_H$ of axle 28 to the bottom surface of frame 12. Operating height H provides a basis for floor 50 of trailer 40 to generally horizontally align with upper surface 52 of loading dock 44, since loading docks generally are constructed at uniform heights, enabling the fork lift to readily drive from the dock into the trailer to load or unload cargo. At operating height H, a point known in the art as the top dead-center T of axle 28 is aligned with vertical centerline $C_V$ of the axle.

Figure 4:
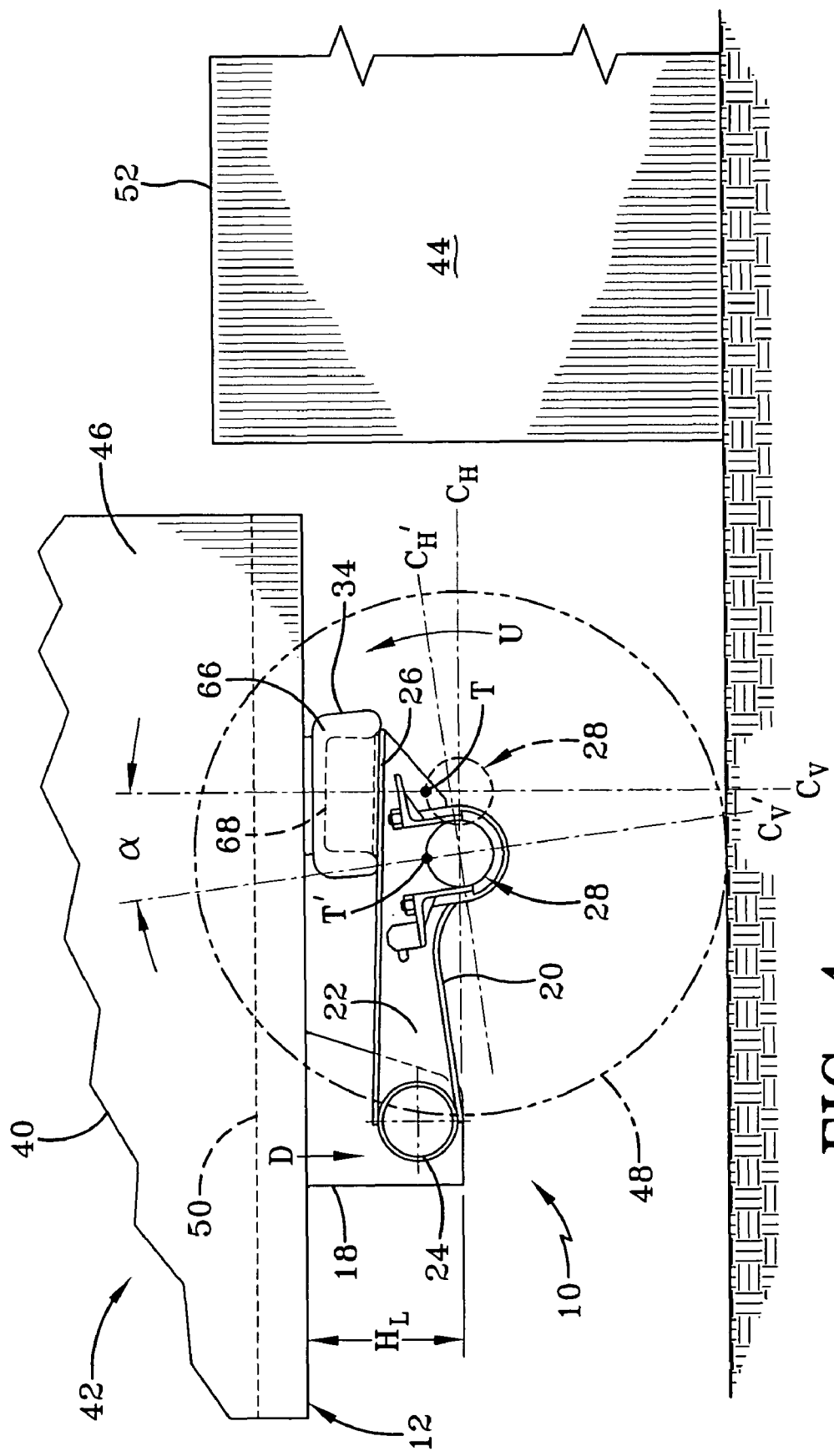
FIG. 4 is a view similar to that of FIG. 3, but showing the position of the vehicle after a fork lift enters the vehicle and the vehicle encounters dock walk.

Turning now to FIG. 4, when the fork lift moves from loading dock 44 into trailer 40, the fork lift causes a sudden weight increase in the trailer. It is to be noted that, when vehicle 42 moves into a loading or unloading position at dock 44 at operating height H, the air pressure in air springs 34 typically is at a generally steady state as shown in FIG. 2. The sudden weight increase of the fork lift driving into trailer 40 temporarily overcomes the steady-state air pressure in air springs 34, which reduces operating height H to a lower level, $H_L$, moving frame 12 and hanger 18 downwardly, as shown by arrow D.

If a control system (not shown) for air springs 34 is active, a sensor detects the downward motion of frame 12 and a height control valve (not shown) directs compressed air into the air springs, thereby raising the frame back up to operating height H, so that the downward movement is only momentary and floor 50 of trailer 40 realigns with upper surface 52 of loading dock 44. If the control system for air springs 34 is inactive, frame 12 typically remains at lower level $H_L$, in which case a bridge plate (not shown) is used to enable the fork lift to drive from trailer floor 50 to loading dock surface 52. In both cases, however, front end 22 of beam 20 moves downwardly, causing rear end 26 of the beam to move in a generally arcuate motion, as shown by arrow U, because beam front end 22 is pivotally attached to hanger 18. Since beam 20 is rigidly attached to axle 28, the axle moves with the beam. Top dead-center point T of axle 28 thus moves to a new, off-center point indicated by T', shifting α degrees. At the completion of axle movement, axle vertical centerline $C_v$ and axle horizontal centerline $C_H$ have also shifted to new respective positions $C_v'$, $C_H'$. Because brake system 38 of vehicle 42 is locked, the described arcuate motion U of beam 20 and axle 28 causes tires 48 to rotate in a forward direction and thus move trailer 40 away from loading dock 44. This movement is commonly known in the art as dock walk.

In the case where the control system and the height control valve (not shown) direct air into air springs 34 to allow only momentary downward movement of frame 12 and hanger 18, the subsequent raising of the frame does not fully compensate for downward movement D and generally arcuate motion U, still resulting in some amount of dock walk. Therefore, dock walk remains a problem whether or not the control system for air springs 34 is activated.

As mentioned above, in an attempt to reduce or prevent dock walk in prior art rigid leading or trailing arm air-ride axle/suspension systems, such as axle/suspension system 10, additional components have been used to reduce the movement of frame 12 when a forklift or other device is introduced into trailer 40 during a loading or unloading situation. For example, some systems employ a stop or similar structural component (not shown) that is secured to frame 12 or to beam 20, or both. If the distance between beam 20 and frame 12 decreases beyond a predetermined amount, the structural stop provides a positive mechanical stop that limits the vertical movement of the frame. Reduction of the vertical movement of frame 12 reduces resulting arcuate motion U of beam 20 and axle 28, in turn reducing the rotation of tires 48, which minimizes dock walk.

In other attempts to reduce or prevent dock walk, different components have been employed in lieu of a separate structural stop. For example, with continuing reference to FIGS. 3 and 4, manual exhaust valves (not shown) have been used with air springs 34 to exhaust air bags 66 of the air springs when vehicle 42 is parked at loading dock 44. Exhausting air bags 66 causes frame 12 to lower onto bumpers 68 that are located within air springs 34, and then brake system 38 (FIG. 2) of vehicle 42 is engaged. When a fork lift drives into trailer 40, bumpers 68 act as a positive mechanical support at rear end 26 of beam 20, minimizing arcuate motion U of the beam and axle 28, respectively, and in turn minimizing forward rotation of tires 48 and dock walk.

Components such as an additional or existing structural stop and/or exhaust valves, as well as associated components for the operation and control of the stop and/or valves, involve an undesirable increase in weight of axle/suspension system 10, as well as an undesirable increase in cost for the system. Moreover, such additional components add to the complexity of axle/suspension system 10, undesirably increasing maintenance costs for the system. Another disadvantage of the use of exhaust valves to try to minimize dock walk is encountered by users who design the cargo height and/or fork lift height to precisely match the inner height of the roof (not shown) of trailer 40. This is often done to utilize as much of the cargo capacity of trailer 40 as possible. In such a situation, when air bags 66 are exhausted, thereby lowering frame 12, the roof height of trailer 40 in relation to dock surface 52 also is lowered, potentially causing the top of the cargo or the top of the fork lift to hit the trailer roof and interfere with the loading or unloading process.

Figure 5A:
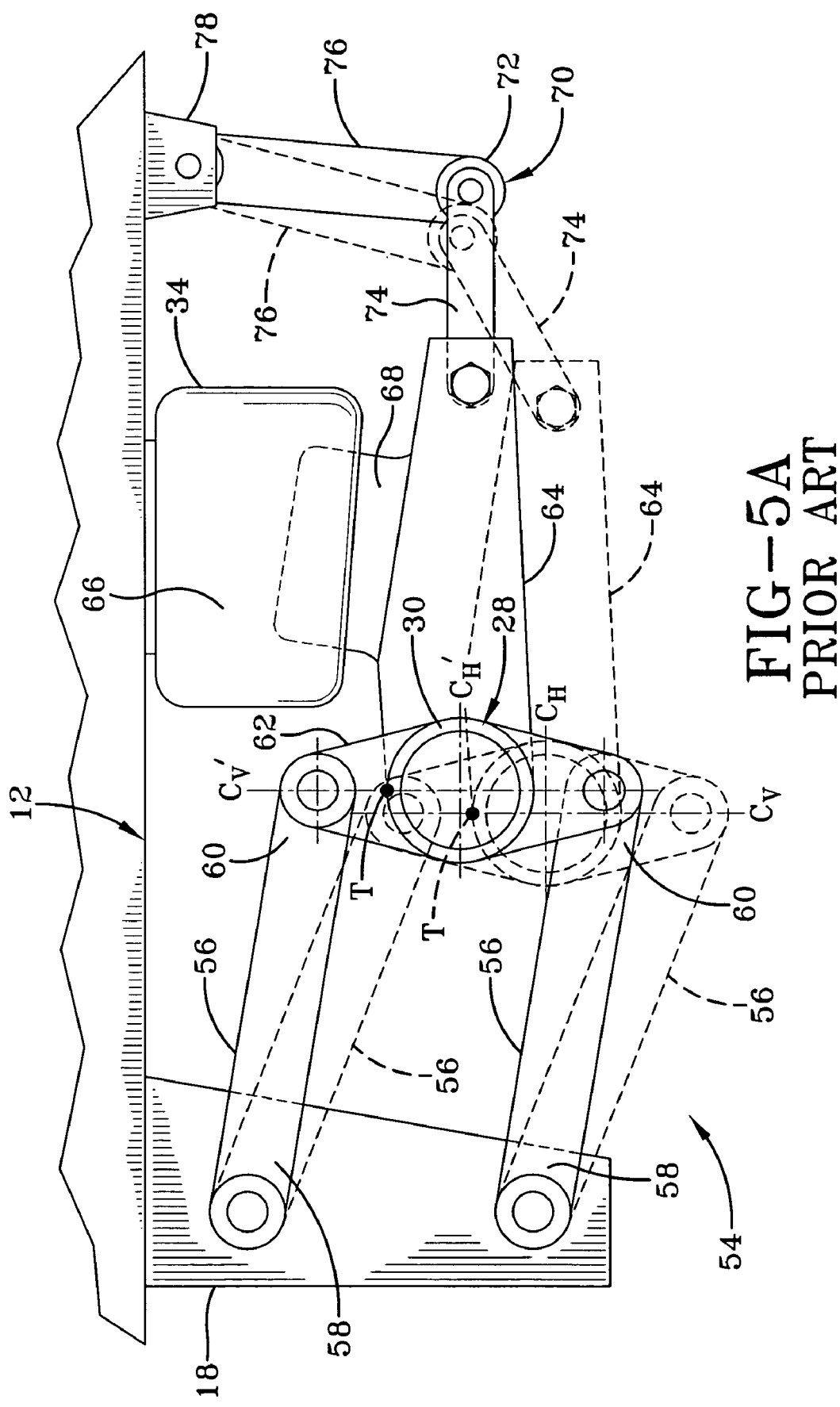
FIG. 5A is a fragmentary schematic representation of a driver's side view of a first prior art parallelogram linkage air-ride axle/suspension system, shown attached to hangers depending from a vehicle frame, with an alternate position of the axle/suspension system represented by dashed lines.

Other types of prior art axle/suspension systems reduce or prevent dock walk, but possess disadvantages related to a lack of roll stability. With reference now to FIG. 5A, one such axle/suspension system is known in the art as a parallelogram axle/suspension linkage and is indicated generally at 54. Parallelogram linkage 54 includes two vertically spaced-apart, parallel links 56, each pivotally attached at a front end 58 to hanger 18, and pivotally attached at a rear end 60 to a bracket 62, which in turn is rigidly connected to axle tube 30. A rearwardly-extending beam 64 also is rigidly connected to axle tube 30, providing a mounting area for a lower end of air spring 34.

When hanger 18 moves downwardly from the weight of a fork lift entering trailer 40, the pivotal attachment of both ends 58, 60 of each link 56 enables axle 28 to shift without the type of arcuate motion of beam 20 and axle 28 as seen in prior art axle/suspension system 10 (FIG. 4). That is, the unloaded position of parallelogram linkage 54 generally is represented by dashed lines, with axle top dead-center point T being aligned with axle vertical centerline $C_v$. The pivotal connection of each link 56 at its respective front end 58 to hanger 18, and to bracket 62 at its respective rear end 60, enables parallelogram linkage 54 to shift in response to the cargo loading situation, with the new position generally indicated by solid lines. Vertical axle centerline $C_v$ and horizontal axle centerline $C_H$ each shift to new respective positions $C_v'$ and $C_H'$ without the type of arcuate motion of beam 20 and axle 28 as seen in prior art axle/suspension system 10, thus enabling axle top dead-center point T to remain at the top dead-center of the axle. Therefore, tires 48 (FIG. 4) do not rotate and dock walk is reduced or eliminated.

A primary disadvantage, however, of this type of axle/suspension system is the inherent lack of roll stability in parallelogram linkage 54 during over-the-road operation of vehicle 42. That is, heavy-duty vehicle 42 and trailer 40 must be prevented from leaning too far during events such as turning of the vehicle, lane-change maneuvers, uneven loading, shifting loads and sloped terrain. The ability of parallelogram linkage 54 to pivot at both front and rear ends 58, 60 essentially eliminates the stiffness that is needed to control lean of trailer 40.

To provide stability, an auxiliary roll bar assembly 70 must be incorporated into parallelogram linkage 54. One form of a roll bar assembly 70 includes a transverse bar 72 that extends between parallelogram linkage 54 on a driver's side of vehicle 42 and a corresponding parallelogram linkage on a curb side of the vehicle. Transverse bar 72 adds stiffness and reduces out-of-phase movement of driver's-side parallelogram linkage 54 relative to the curb-side parallelogram linkage. In roll bar assembly 70, a fore-aft extending horizontal arm 74 pivotally connects transverse bar 72 to beam 64, while a vertical arm 76 pivotally connects the transverse bar to frame brackets 78 on either side of main frame 12.

Figure 5B:
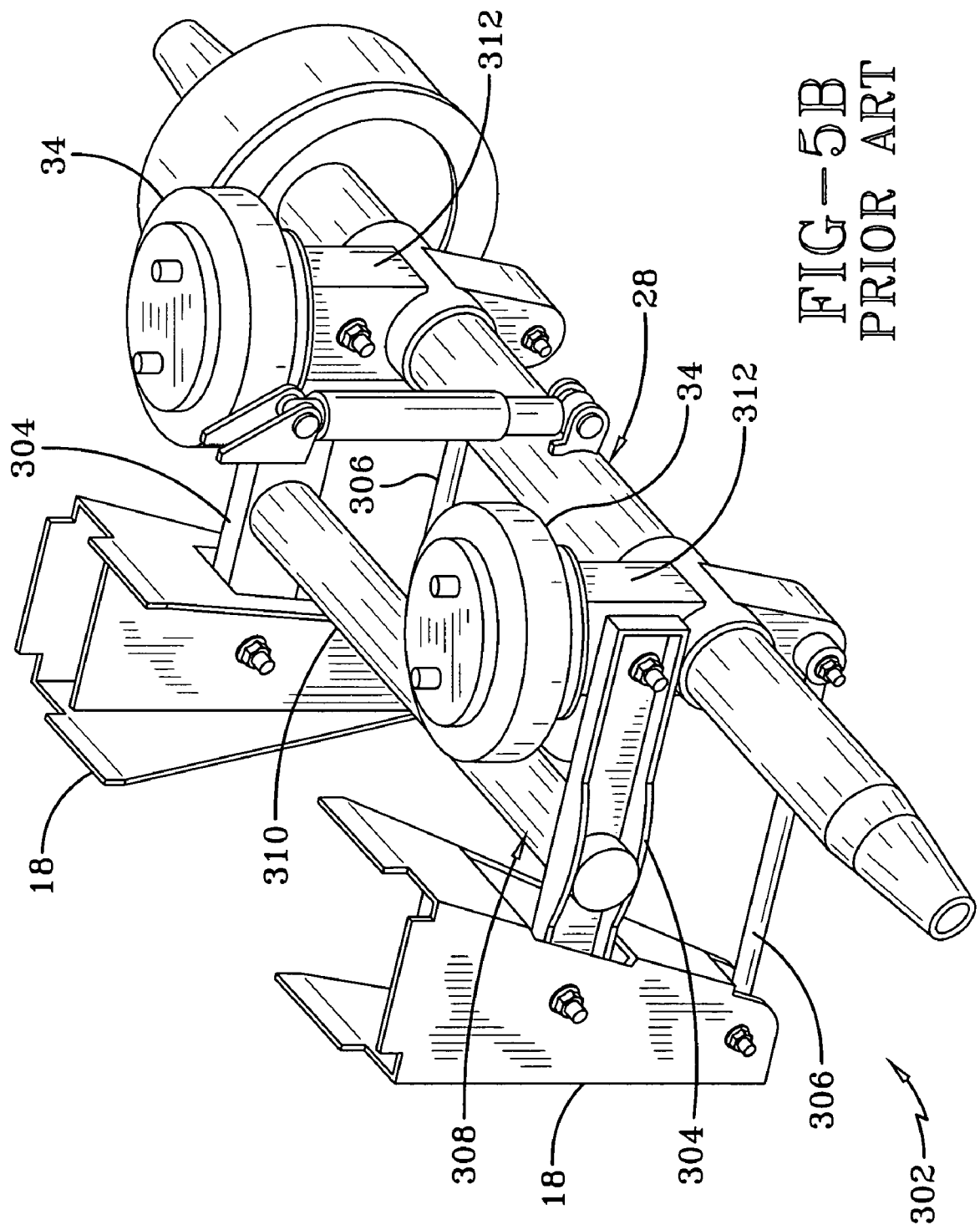
FIG. 5B is a driver's side rear top perspective view of a second prior art parallelogram linkage air-ride axle/suspension system, shown attached to hangers.

Another parallelogram axle/suspension linkage is shown in FIG. 5B and is indicated generally at 302. Parallelogram linkage 302 includes upper links 304, which are vertically spaced apart from lower links 306. Upper and lower links 304, 306 are pivotally attached to hangers 18 and extend rearwardly to axle 28. A roll bar assembly 308 includes a transverse bar 310, which extends between and is interconnected with upper driver's side and curb side links 304. Alternatively, transverse bar 310 can extend between and be interconnected with air spring mounting brackets 312 or lower links 306.

In both prior art parallelogram axle/suspension linkages 54, 302, transverse bar 72, 310 enables axle 28 to move vertically, as long as the driver's side and curb side links 56, 304, 306 or air spring mounting brackets 312 move together, again reducing the out-of-phase movement that creates unstable behavior. The addition of the multiple components of auxiliary roll bar assemblies 70, 308, however, undesirably increases the weight, cost, complexity, and maintenance of parallelogram linkages 54, 302.

Figure 5C:
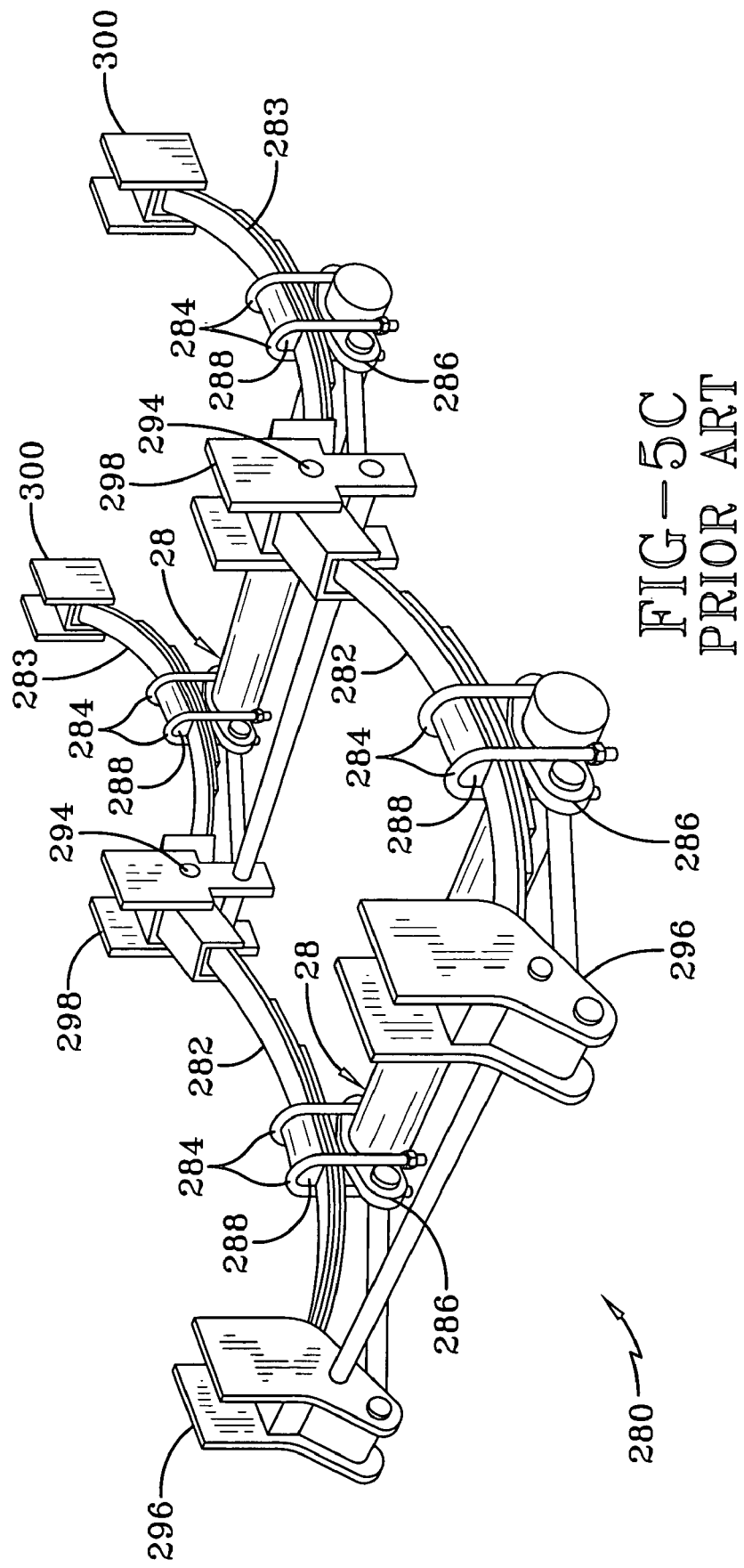
FIG. 5C is a driver's side front top perspective view of a prior art spring suspension system, shown attached to hangers.

Turning now to FIG. 5C, another prior art alternative axle/suspension system, known as a mechanical spring suspension, is indicated generally at 280. Spring suspension 280 is not an air-ride system, and instead includes a pair of transversely-spaced front leaf springs 282, each one of which extends longitudinally between a front hanger 296 and a center hanger 298, and a pair of transversely-spaced rear leaf springs 283, each one of which extends longitudinally between the center hanger and a rear hanger 300. It is important to note that front and rear leaf springs 282, 283 typically rest on slipper blocks (not shown) in their respective hangers 296, 298, 300, rather than being clamped or bolted to the hangers. Each axle 28 connects to a midpoint of each corresponding spring 282, 283 with U-bolts 284, an axle seat 286 and a top block 288.

Springs 282, 283 are engineered to carry the vertical load of the vehicle, and therefore typically are stiff enough to control roll forces. The stiffness of springs 282, 283 creates a significant disadvantage for spring suspension 280, since the springs must be engineered to be stiff enough to provide vertical force resistance and thus roll stability for a fully-loaded trailer 40, which sacrifices flexibility in situations where the trailer is only lightly loaded, thereby creating an extremely harsh ride when the trailer is lightly loaded. Thus, the ride that is enabled by spring suspension 280 is considerably less than optimum.

Therefore, in the prior art, the competing demands of stiffness or rigidity for roll stability, and flexibility to assist in cushioning vehicle 42 from vertical impacts and to provide compliance so that the axle/suspension system resists failure, and the ability to reduce or prevent dock walk, have led to axle/suspension systems that provide less-than-optimum reaction of forces, and which are undesirably heavy, complex and expensive. As a result, a need has existed in the art to develop a leading or trailing arm air-ride axle/suspension system that overcomes the disadvantages of prior art systems and provides a system that can provide vehicle roll stability while potentially reducing or eliminating dock walk, and in a lighter weight, simpler and more economical manner than prior art systems.

Turning now to the drawings of the present invention, wherein the illustrations are for showing preferred embodiments of the invention, and not for limiting the same, FIGS. 6-9 show a first embodiment of a heavy-duty vehicle air-ride axle/suspension system, indicated generally at 200, useful in vehicle 42. First embodiment axle/suspension system 200 is shown as a trailing arm system for the purpose of convenience, and it is to be understood that the first embodiment axle/suspension system also includes leading arm systems. Moreover, it is understood that the present invention can be used with various types of frames used for heavy-duty vehicles, including primary frames that do not support a subframe and primary frames and/or floor structures that do support a subframe. For primary frames and/or floor structures that do support a subframe, the subframe can be non-movable or movable.

Figure 6:
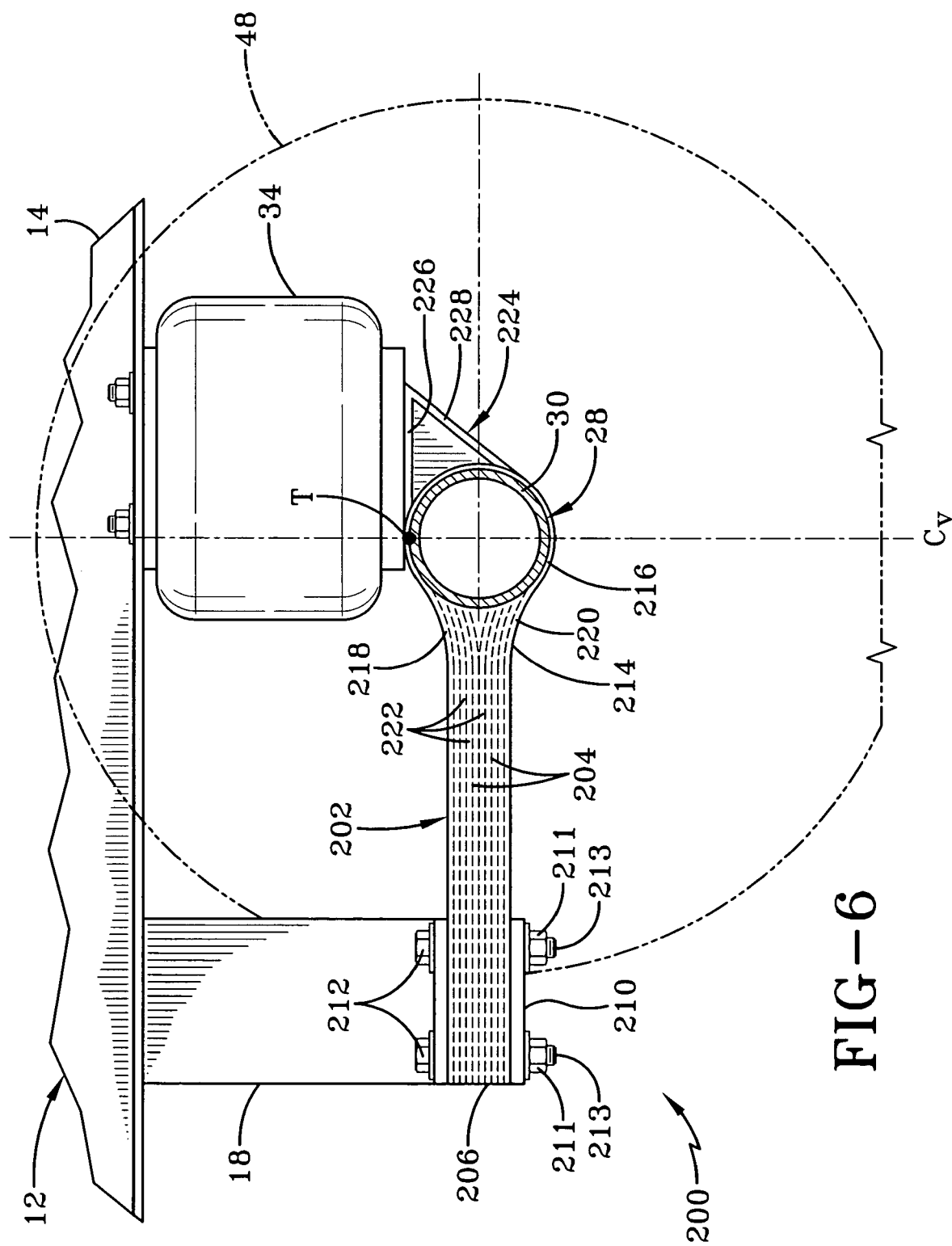
FIG. 6 is a fragmentary driver's side elevational view of a first embodiment of the heavy-duty vehicle axle/suspension system of the present invention, shown in a neutral position, attached to a vehicle frame and with a vehicle tire represented by dashed lines.

With particular reference to FIG. 6, first embodiment axle/suspension system 200 includes a beam 202 that includes a plurality of fiber-reinforced composite mats 204. For example, beam 202 preferably includes from about three to twenty mats, which are stacked horizontally to form an integral beam structure. Mats 204 are engineered to meet application-specific design requirements, such as spring rate and strength, as known to those skilled in the art of composite design. Mats 204 include a reinforcing material, such as glass fibers, carbon fibers, or other known reinforcing materials, which are resistant to tensile stretching. The fibers are dispersed in a polymeric or metallic matrix that is generally flexible, as known in the art of composite material design. Preferably, the fibers generally are more dimensionally stable than the matrix, which contributes to the advantages of beam 202, which are described in detail below.

Beam 202 preferably has a substantially constant cross-section in a transverse direction relative to vehicle frame 12 (FIG. 1), which enables the beam to be manufactured through processes such as pultrusion or extrusion. That is, any cross section of beam 202 taken along a longitudinal or fore-aft line is substantially the same. Preferably, mats 204 of beam 202 are pultruded, which involves pulling fibers, or a fiber-reinforcing material, through a resin bath and then through a die, as known in art of composite forming. More preferably, mats 204 are pultruded or pulled in a direction that is parallel to axle 28. Pultrusion in this direction provides integral hanger and axle connection areas, as will be described in greater detail below. In addition, pultrusion in this direction is conducive to the orientation of the fibers in selected ones of mats 204 in a manner that provides transverse strength, or strength across the entire width of each mat, that is, extending from the driver's side of the vehicle to its passenger side. Such transverse strength in turn increases the transverse stability of beam 202 and thereby improves the roll stability of the beam and thus axle/suspension system 200.

More particularly, pultrusion of mats 204 in a transverse direction, or in a direction parallel to axle 28, enables the fibers in the mats to be oriented at an angle in a range of from about 0 to about 90 degrees relative to the fore-aft direction of beam 202. It is to be noted that the fore-aft direction of beam 202 is a direction that is generally perpendicular to axle 28. Preferably, a selected percentage of the fibers in mats 204 are oriented at an angle in a range of from about plus or minus 30 degrees to about plus or minus 60 degrees relative to the fore-aft direction of beam 202. More preferably, a selected percentage of the fibers in mats 204 are oriented at an angle of about plus or minus 45 degrees relative to the fore-aft direction of beam 202, plus or minus a tolerance of about 15 degrees, which is desirable for optimum transverse strength and thus provides roll stability for axle/suspension system 200. For example, about 25 percent of the fibers in mats 204 may be oriented at an angle of about zero degrees relative to the fore-aft direction of beam 202, while another 25 percent of the fibers may be oriented at an at an angle of about plus 45 degrees relative to the fore-aft direction of the beam, yet another 25 percent of the fibers may be oriented at an angle of about plus 90 degrees relative to the fore-aft direction of the beam, and a final 25 percent of the fibers may be oriented at an angle of about minus 45 degrees relative to the fore-aft direction of the beam.

It is understood that the different fiber orientations in mats 204 and thus beam 202 provide strength for the beam in various directions. For example, fibers generally oriented parallel to the direction of axle 28 provide strength during the pultrusion of mats 204 and beaming strength during vehicle operation, while fibers oriented generally perpendicular to the direction of the axle provide fore-aft strength and brake reaction strength, and fibers generally oriented at about 45 degrees to the direction of the axle provide roll stability. Moreover, if desired for a particular application, any of mats 204 may include fibers oriented at a combination of the above-described orientations, that is, in multiple directions within the same mat. With such construction, mats 204 and thus beam 202 generally exhibit spring-like behavior, as will be described in greater detail below.

Beam 202 includes a front end 206 that is generally rigidly secured to hanger 18 under compression in a clamped fashion, as opposed to prior art systems 10, 54, 280, 302 which are secured in a pivoted fashion. It should be noted that, while hanger 18 is sometimes considered to be part of the vehicle frame or subframe once it is connected to members of the frame or subframe, as described above, the hanger is typically engineered as part of axle/suspension system 200.

To facilitate such clamping, front end 206 of beam 202 is aligned under hanger 18 and a bottom securing plate 210 is aligned with the hanger under the front end of the beam. Securing plate 210 then is attached to hanger 18 and beam 202, such as by bolts 212 that pass through aligned openings (not shown) formed in the bottom securing plate, mats 204 and the hanger, thus sandwiching beam 202 in compression when nuts 211 each are threadably engaged with and tightened down on a threaded end 213 of a respective one of the bolts. This construction allows beam 202 to function as a clamped cantilever spring, as will be described in greater detail below.

Opposite front end 206 of beam 202 is a rear end 214. Rear end 214 of beam 202 is connected to axle 28. To facilitate the connection, a sleeve 216 is formed at rear end 214 of beam 202. More particularly, at beam rear end 214, one or more top mats 218 and one or more bottom mats 220 of the stack each are formed integrally with one another and combine to form sleeve 216 for receiving and immovably capturing axle tube 30. Sleeve 216 is secured to axle tube 30 by an interference fit, adhesive bonding, or mechanical fasteners, such as bolts and/or pins, or a combination thereof. Interior mats 222 are sandwiched between one or more top mats 218 and one or more bottom mats 220, and terminate at rear end 214 of beam 202 and abut axle tube 30, or join the top and bottom mats in forming sleeve 216. Preferably, as interior mats 222 terminate, those that are closer to top mat 218 angle upwardly, while those that are closer to bottom mat 220 angle downwardly, which reinforces the formation of sleeve 216 by the top and bottom mats. It is to be noted that each of top mat 218 and bottom mat 220 may optionally include a series of horizontally-stacked layers or mats for additional structural stability of beam 202. Also shown in FIG. 6 is top dead-center point T of axle 28, which is aligned with vertical centerline $C_v$ of the axle.

Figure 10:
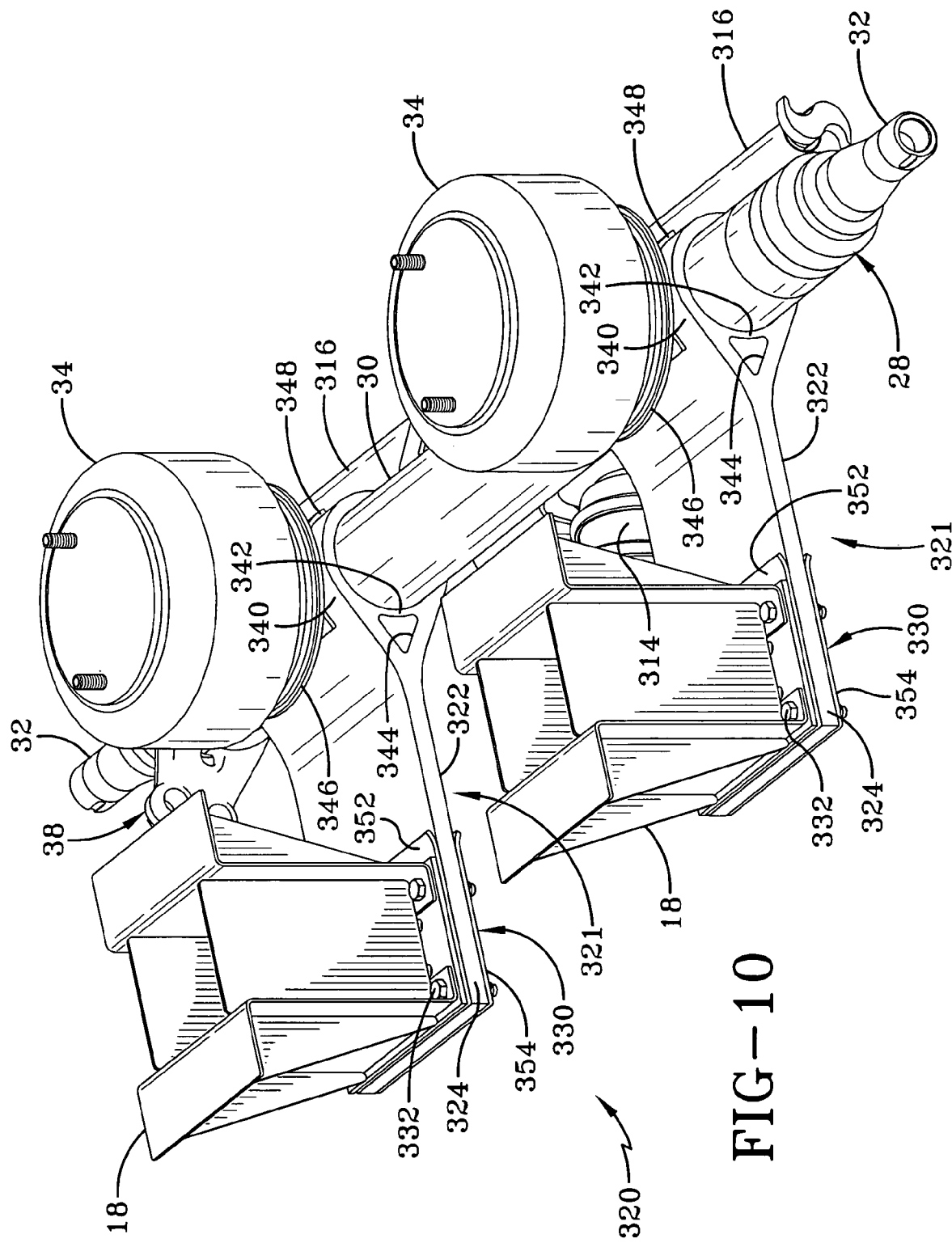
FIG. 10 is a driver's side front top perspective view of a second embodiment of the heavy-duty vehicle axle/suspension system of the present invention, shown attached to vehicle frame hangers, and including certain brake components.

To facilitate the mounting of air springs 34, a mounting bracket 224 is formed integrally with and extends rearwardly from sleeve 216, and includes a platform 226 and a rear wall 228. Platform 226 is located adjacent to the top of axle 28, thereby enabling positioning of air spring 34 above the axle and generally in vertical alignment with the axle, which reduces the amount of static offset loading encountered by first embodiment axle/suspension system 200. This position of air spring 34 above and generally in vertical alignment with the axle minimizes the resulting moment arm created by the air spring, reducing the forces encountered by first embodiment axle/suspension system 200 of the present invention. In certain applications, it may be desirable to shift the alignment of air spring 34 relative to axle 28, in which case the benefit of force reduction may still be achieved as long as some portion of the air spring is generally in vertical alignment with the centerline of the axle. Of course, in such a case, mounting bracket 224 and platform 226 may be modified to position the air spring accordingly. Rear wall 228 may be adapted in shape and/or size to accommodate the mounting of other components, such as brake air chambers 316 (FIG. 10). Additional walls (not shown) may optionally be added to mounting bracket 224 and/or beam 202 to facilitate the mounting of such components.

Figure 7:
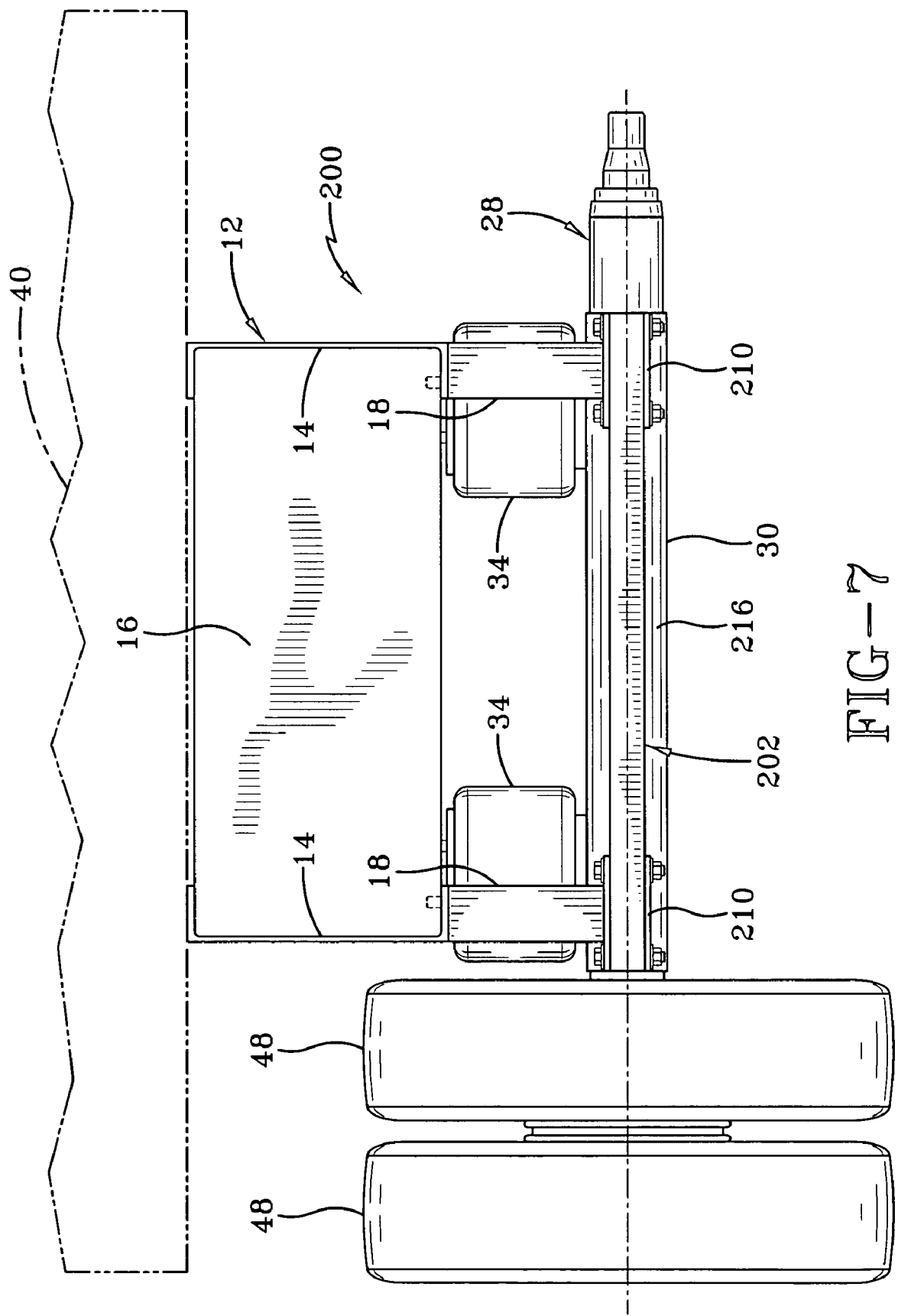
FIG. 7 is a fragmentary front elevational view of the heavy-duty vehicle axle/suspension system shown in FIG. 6, with passenger side tires attached, with a vehicle trailer represented by dashed lines.

With additional reference now to FIG. 7, beam 202 preferably extends transversely across a substantial portion of the length of axle tube 30, thereby requiring only one beam for first embodiment axle/suspension system 200, rather than two separate beams. This construction also allows beam 202 to distribute forces across the transverse width of the stack, increasing force distribution and roll stability. Moreover, the use of single beam 202 across a substantial length of axle tube 30 allows for increased design customization, as the number and characteristics of mats 204 can be tailored for specific applications and anticipated loads, as mentioned above. It is important to note that, depending upon desired design and/or application requirements, beam 202 optionally may be configured in a two-beam structure, that is, one beam for the driver's side of axle 28 and a separate beam for the curb side of the axle, wherein a pair of suspension assemblies comprise the axle/suspension system of the present invention.

First embodiment axle/suspension system 200 provides substantial roll stability. The use of beam 202, which is rigidly affixed at front end 206 to hanger 18 and thus trailer frame 12, generally operates like a fixed cantilever spring, with the exception that top mat 218 and bottom mat 220 form sleeve 216 at their respective rear ends 214. Beam 202 has a certain spring rate, that is, the beam is designed so that it takes a certain amount of force to deflect the beam upwardly and a certain amount of force to deflect the beam downwardly, while being neutral at vehicle ride height. In order for trailer 40 to lean or sway due to roll forces, one of driver's side or curb side axle spindles 32 must move vertically so that it is a different distance away from frame 12 than the transversely opposing curb or driver's side spindle, respectively. The forces that are required to negate this movement can be calculated, enabling mats 204 and thus beam 202 to be engineered to include a spring rate that is stiff enough to control such roll or sway. It is to be noted that the spring rate may be used in conjunction with the above-described transverse strength of beam 202 to control roll or sway. Accordingly, since the stiffness of each mat 204 and thus beam 202 is engineered to be neutral at ride height, air springs 34 are able to provide a soft ride, while the beam works to control sway when vehicle 42 leans.

An additional benefit of beam 202 being neutral at vehicle ride height, which is a term of art in the heavy-duty vehicle industry, is improvement of the life of axle/suspension system 200, particularly with respect to prior art spring suspension 280. More particularly, in prior art spring suspension 280, composite materials have sometimes been used for leaf springs 282, 283 (FIG. 4C), which must support the vertical load of trailer 40 to maintain the vehicle ride height. Since springs 282, 283 of spring suspension 280 must support the weight of trailer 40, the springs experience stress even when the trailer is not loaded with freight. When trailer 40 is fully loaded with freight, springs 282, 283 therefore are highly stressed. Then, as fully-loaded trailer 40 travels over-the-road, potholes, curbs and other impact-related events are encountered, which input more stress to springs 282, 283, which may cause the composite springs to delaminate, which is an internal structural separation of the composite.

In contrast, beam 202 of first embodiment axle/suspension system 200 preferably is designed to experience stresses in a lower range than prior art spring suspension 280 by being neutral, or generally unstressed, when trailer 40 is unloaded or loaded with freight and the axle/suspension system is maintaining vehicle ride height. By being neutral at ride height for loaded trailer 40, beam 200 enables air springs 34 to provide optimum ride cushioning. Therefore, when loaded trailer 40 experiences impacts from traveling over-the-road, beam 202 experiences relatively low stresses, which reduces the fatigue on axle/suspension system 200. Such reduction of stress and fatigue extends the life of beam 202 and reduces the chances of delamination of the beam.

Figure 8:
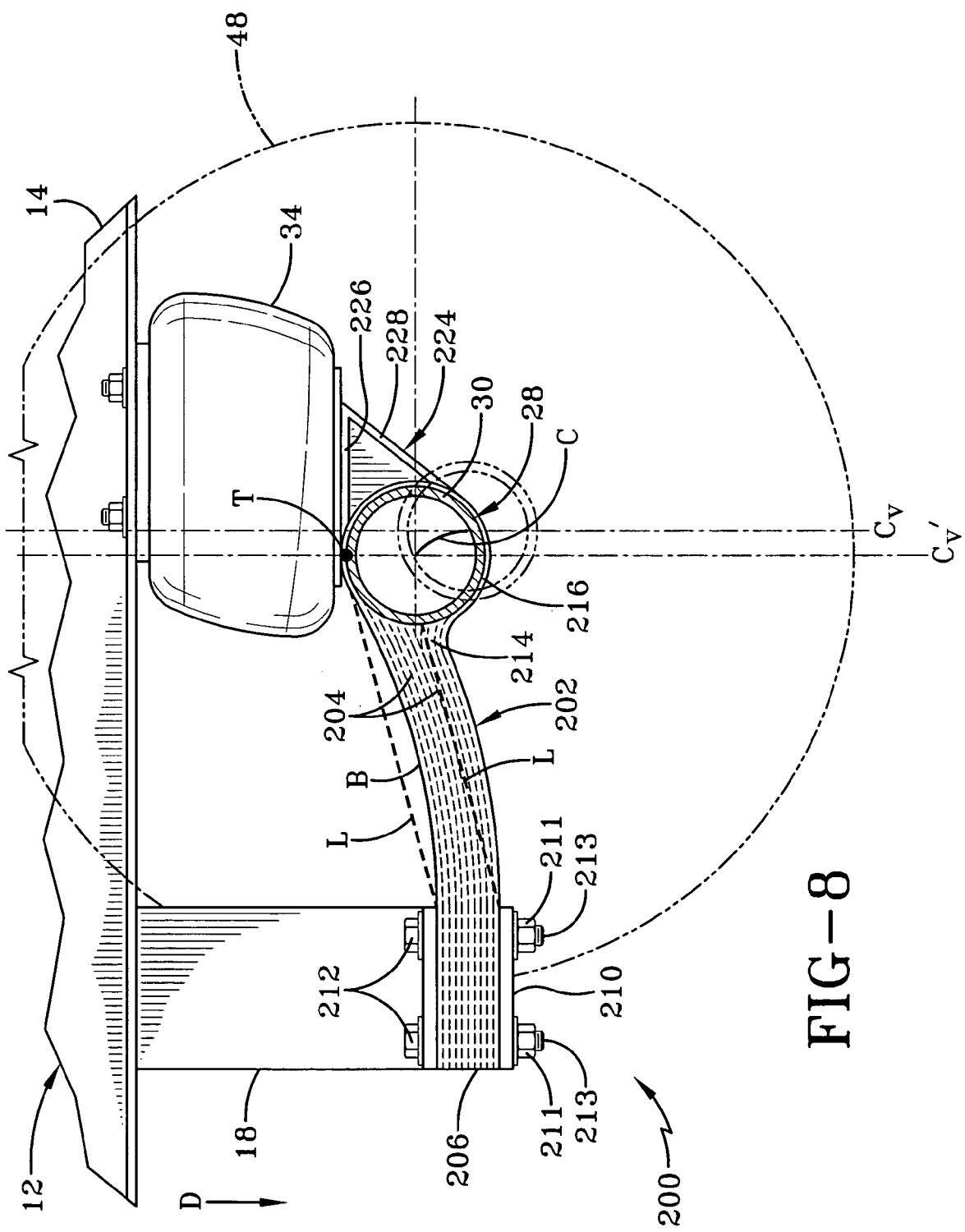
FIG. 8 is a side elevational view of the heavy-duty vehicle axle/suspension system shown in FIG. 6, further showing a representative position of the axle/suspension system after a fork lift enters the vehicle.

Moreover, turning now to FIG. 8, the construction of beam 202 and its attachment to hanger 18 and axle 28 may reduce or prevent the type of arcuate motion of beam 20 and the axle as seen in prior art axle/suspension system 10 (FIG. 4) when the hanger moves downwardly, thus potentially reducing or eliminating dock walk. More particularly, as described above, when a fork lift drives into trailer 40, hanger 18 moves downwardly as indicated by arrow D. Front end 206 of beam 202 is generally rigidly secured to hanger 18 and thus moves with the hanger, while rear end 214 of the beam moves closer to frame 12. Mats 204 each exhibit substantially identical deflection characteristics that define a predictable curvature along locus arc B when front end 206 moves downwardly with hanger 18 and rear end 214 moves closer to frame 12, due in part to the dimensional stability of the fibers in each mat. The predictable curvature along locus arc B causes rear end 214 and original axle vertical centerline $C_v$ (represented by dashed lines) to shift along arc C in a manner that is parallel with front end 206 to a new position $C_v'$, thereby forming a parallelogram as indicated by dashed lines L. This shift from $C_v$ to $C_v'$ should occur without the type of arcuate motion of beam 20 and axle 28 as seen in prior art axle/suspension system 10 (FIG. 4). Since the type of arcuate motion of prior art beam 20 and axle 28 may be eliminated, axle top dead-center point T may remain at the top dead-center of the axle. As a result, tires 48 should not rotate forwardly as hanger 18 moves downwardly, thereby reducing or eliminating dock walk.

Figure 9:
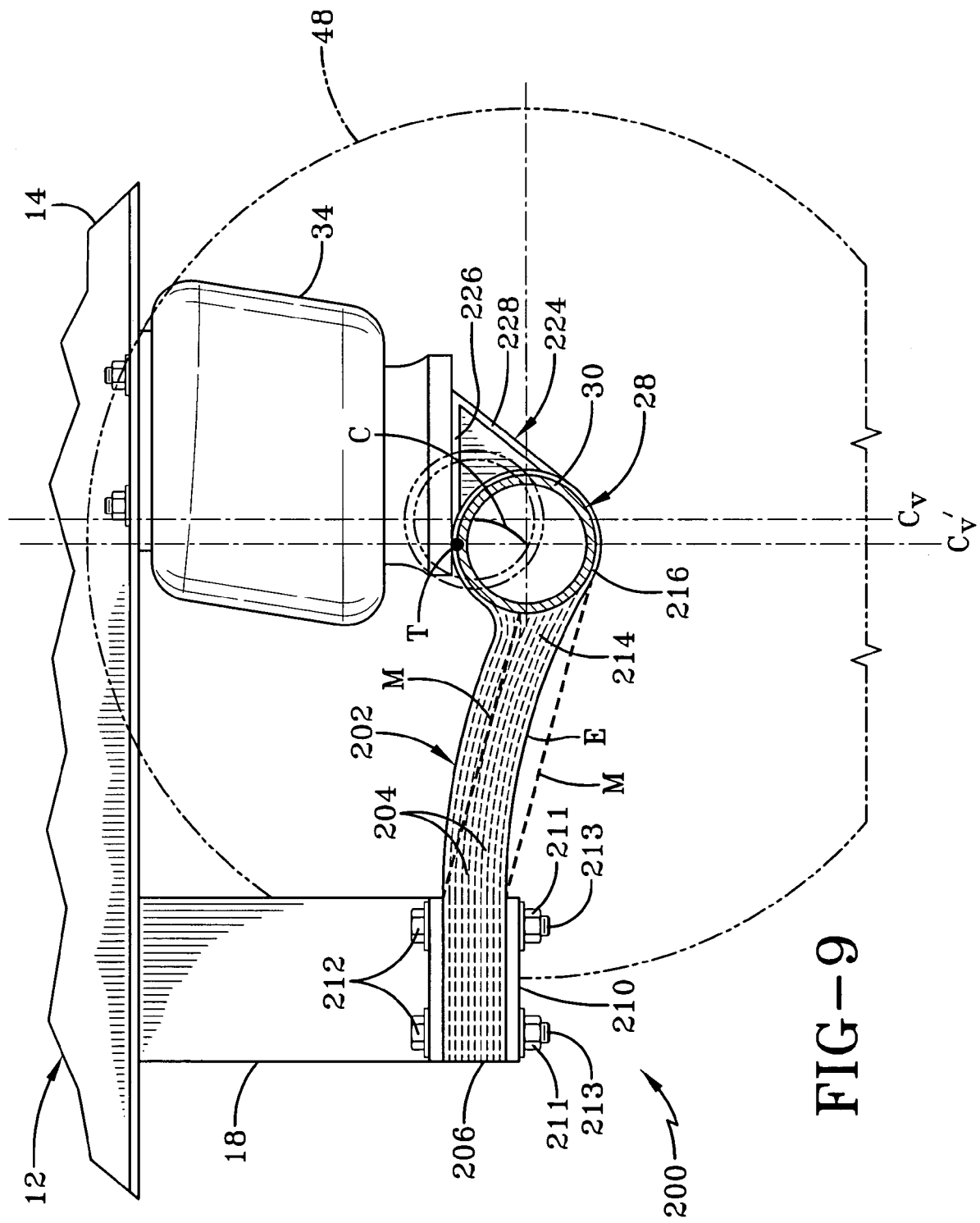
FIG. 9 is a side elevational view of the heavy-duty vehicle axle/suspension system shown in FIG. 6, further showing a representative position of the axle/suspension system after a fork lift exits the vehicle.

As shown in FIG. 9, after the fork lift exits trailer 40, hanger 18 springs upwardly due to the combination of the sudden loss of the weight of the fork lift and the upward force of air spring 34. This upward spring caused beam 20 of prior art axle/suspension system 10 to move in a generally arcuate motion opposite the direction of arrow U (FIG. 4). The rigid attachment of beam 20 to axle 28 potentially resulted in corresponding rearward arcuate motion of the beam and the axle. The rearward arcuate motion of beam 20 axle 28 created a rearward rotation of tires 48, thus often causing rear end 46 of trailer 40 to strike loading dock 44, which is undesirable.

First embodiment axle/suspension system 200 may reduce or eliminate such movement. More specifically, when hanger 18 moves upwardly, front end 206 of beam 202 moves with the hanger, while rear end 214 of the beam moves away from frame 12. Mats 204 each exhibit substantially identical deflection characteristics that define a predictable curvature along locus arc E when front end 206 moves upwardly with hanger 18 and rear end 214 moves away from frame 12. The predictable curvature along locus arc E causes rear end 214 and original axle vertical centerline $C_v$ (represented by dashed lines) to shift along arc C in a manner that is parallel with front end 206 to a new position $C_v'$, thereby forming a parallelogram as indicated by dashed lines M. This shift from $C_v$ to $C_v'$ should occur without the type of arcuate motion of beam 20 and axle 28 as seen in prior art axle/suspension system 10 (FIG. 4). Since the type of arcuate motion of prior art beam 20 and axle 28 may be eliminated, axle top dead-center point T may remain at the top dead-center of the axle. As a result, tires 48 should not rotate rearwardly as hanger 18 moves upwardly, thereby reducing or eliminating rearward movement of trailer 40.

It is also important to note that beam 202 reduces undesirable significant downward movement of axle 28. For example, trailer 40 is, at times, lifted onto a rail car (not shown). With prior art air-ride axle/suspension systems 10, 54, 302, when trailer 40 is lifted, axle 28 moves downwardly until shock absorbers 36 (FIG. 2) are fully extended, which allows for a significant drop of the axle. This drop stretches air bag 66 of air spring 34, which creates a vacuum in the air bag, causing it to fold inwardly. When trailer 40 is placed onto the rail car, folded air bag 66 then is sometimes pinched within air spring 34, potentially damaging the air bag. Beam 202 reduces or prevents this vacuum fold-in effect, since it has a stiffness that builds resistance as the beam moves downwardly, and thereby resists significant downward movement of axle 28. This resistance to downward movement of axle 28 contributes to the potential elimination of shock absorbers 36, since the need for a positive lower stop is eliminated.

These aspects of first embodiment axle/suspension system 200 are different from prior art axle/suspension system 10, which includes a rigid structure that is designed to generally prevent movement of axle spindle 32 associated with roll or sway, but then uses discrete components such as bushing assembly 24 to provide a predictable amount of compliance, which enables control of roll forces. First embodiment axle/suspension system 200 also is different from parallelogram suspensions 54, 302 which pivot freely, enabling sway, but then use a discrete roll bar component 70, 308 to resist the movement associated with roll or sway. First embodiment axle/suspension system 200 is different from prior art spring suspension 280 as well, since that system utilizes stiff springs 282, 283 to resist sway, which also carry the load and are therefore too stiff to provide a cushioned ride when vehicle 42 is only lightly loaded.

Also, there is less side-to-side movement with first embodiment axle/suspension system 200 than with prior art parallelogram linkage connections 54, 302. Using parallelogram axle/suspension system 54 as an example, each link 56 of the prior art parallelogram linkage connection requires two pivot connections, that is, four pivot connections for each of the driver's side and curb side suspension assemblies. With one driver's side suspension 54 and one curb side suspension, there are eight total pivot connections, all of which need clearance to rotate. This clearance results in lateral movement of parallelogram axle/suspension system 54. First embodiment axle/suspension system 200, in contrast, includes no such pivoted connections, thereby eliminating the lateral movement associated with the clearance for such connections. In addition, by eliminating such prior art pivoted connections, first embodiment axle/suspension system 200 also eliminates the angular lateral movement associated with those connections. As a result, first embodiment axle/suspension system 200 accomplishes both roll stability and a reduction in dock walk in a relatively simple manner that is improved over prior art axle/suspension systems 10, 54, 280, 302.

Moreover, since mats 204 preferably are formed of a composite material with a constant cross-section, which allows the mats to be pultruded or extruded, first embodiment axle/suspension system 200 may be manufactured more economically than systems of the prior art. The use of a composite material to form mats 204 and thus beam 202 also leads to a desirable reduction in weight over prior art systems 10, 54, 280, 302 that use heavier steel components. Use of a composite material for mats 204 also increases the resistance to corrosion of first embodiment axle/suspension system 200. It is understood that, while reference to a fiber-reinforced composite for mats 204 has been made above, other types of composite materials may be employed without affecting the overall concept or operation of the invention, such as particle-reinforced composites and structural composites such as laminates, including combinations thereof, and any type of matrix and dispersed phase or filler as known in the composite material art.

It is to be understood that the illustrated structure of beam 202 is by way of example, as the configuration of mats 204 can be adjusted to achieve desired performance characteristics and force distribution needed for a particular application. For example, mats 204 may be arranged to form a truss structure or other frame-type structure, rather than stack 202. Further advantages of first embodiment axle/suspension system 200 will be described below, including resisting downward movement to eliminate the need for shock absorbers, enabling quicker inflation for air springs 34, providing a visual ride-height check, reducing lateral movement and allowing the air springs to provide optimum ride cushioning.

Figure 11:
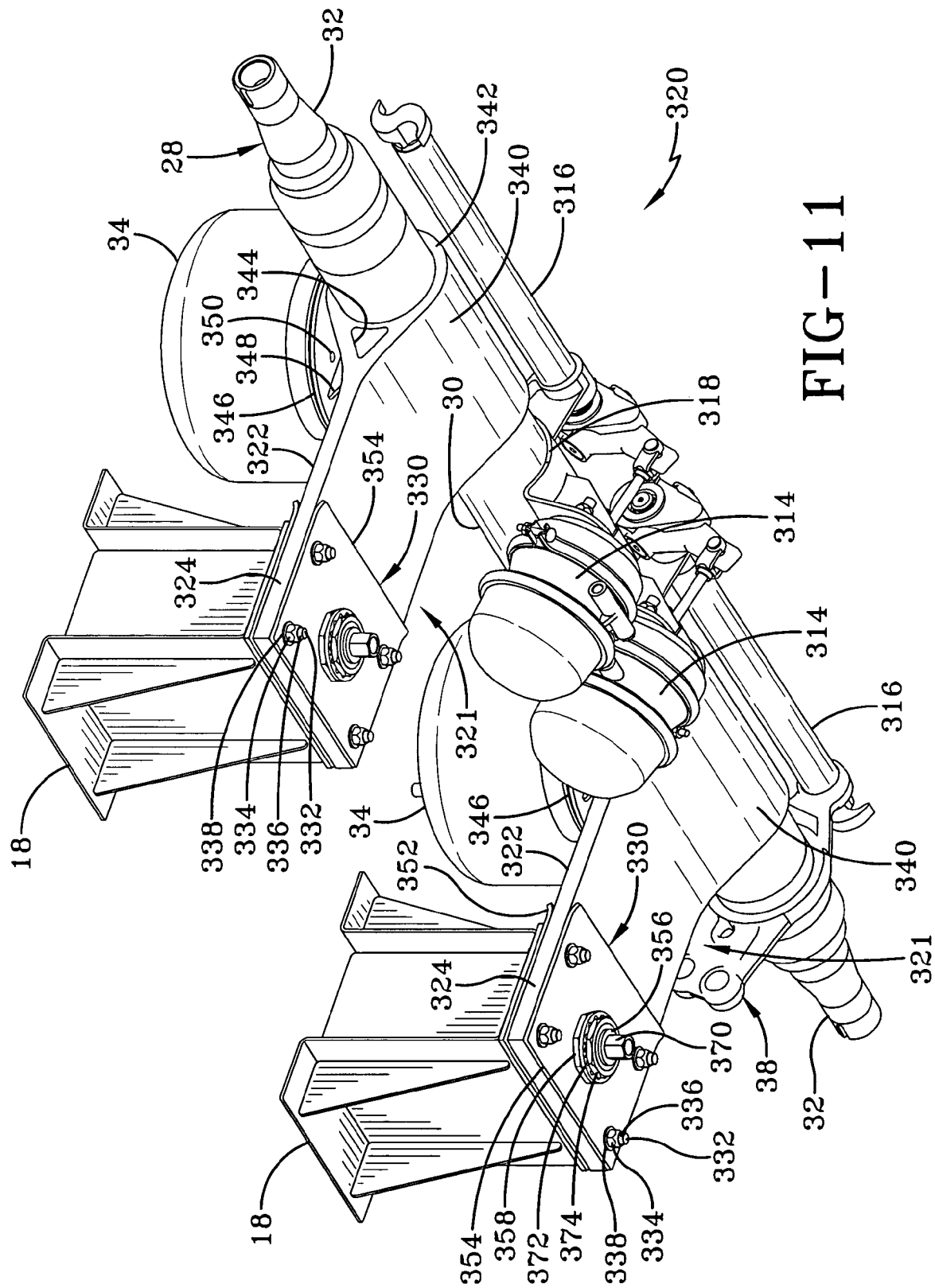
FIG. 11 is a driver's side front bottom perspective view of the heavy-duty vehicle axle/suspension system and hangers shown in FIG. 10.
Figure 12:
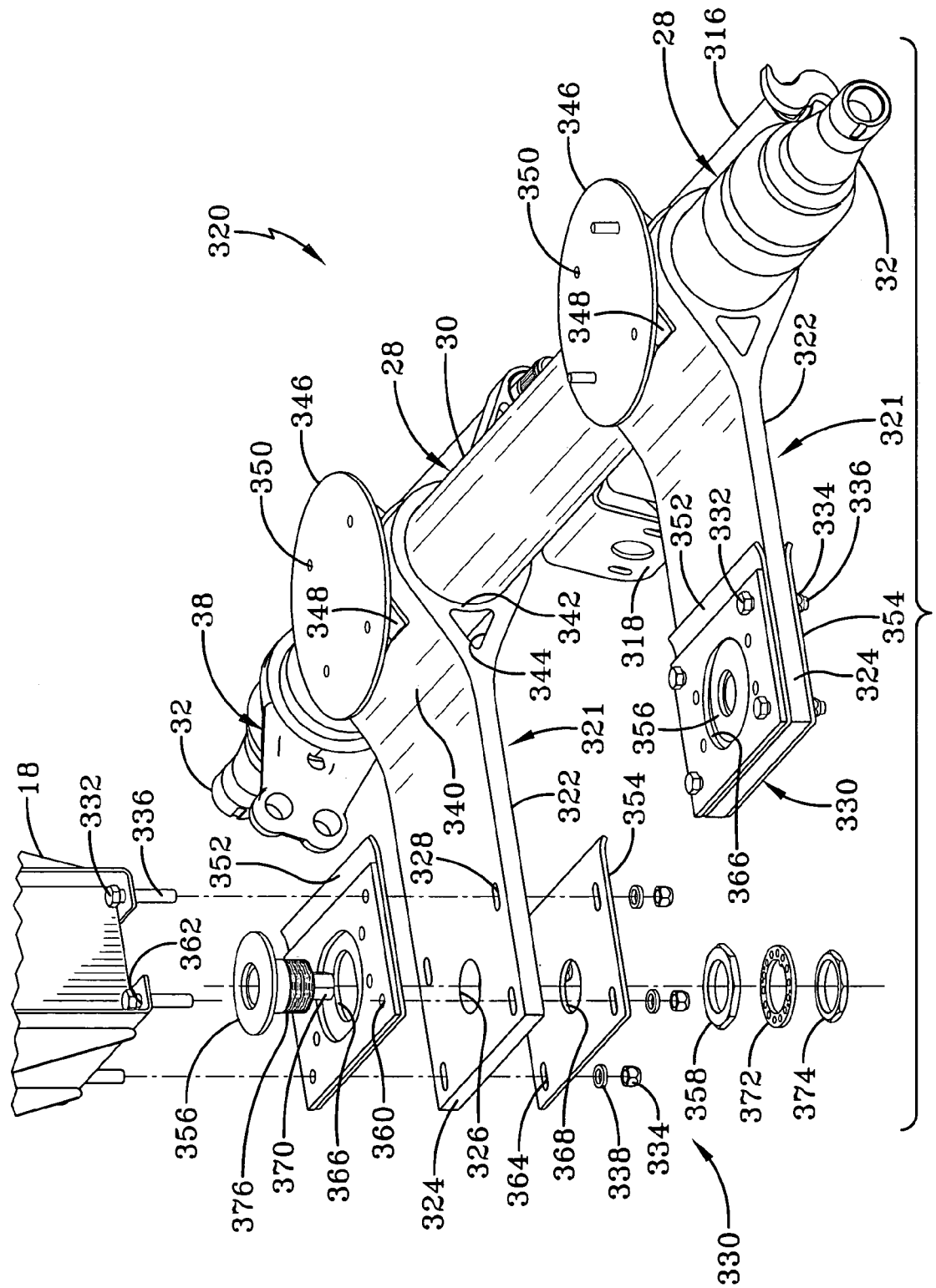
FIG. 12 is a fragmentary driver's side front top perspective view of the heavy-duty vehicle axle/suspension system shown in FIG. 10, with one alignment assembly shown in exploded form and another alignment assembly shown in assembled form.

Turning now to FIGS. 10-12, a second embodiment of an axle/suspension system of the present invention is indicated generally at 320, and is useful in vehicle 42. Second embodiment axle/suspension system 320 is shown as a trailing arm system for the purpose of convenience, and it is to be understood that the second embodiment axle/suspension system also includes leading arm systems. It is understood that axle/suspension system 320 includes a generally identical pair of trailing arm suspension assemblies 321, each one of which is disposed on a respective one of the driver's side and passenger side of vehicle 42. Inasmuch as each suspension assembly 321 is generally identical to the other, only one will be described herein. Moreover, it is understood that the present invention can be used with various types of frames used for heavy-duty vehicles, including primary frames that do not support a subframe and primary frames and/or floor structures that do support a subframe. For primary frames and/or floor structures that do support a subframe, the subframe can be non-movable or movable.

With particular reference to FIGS. 10 and 11, second embodiment axle/suspension system 320 preferably includes a pair of longitudinally-extending, transversely-spaced parallel beams 322, each of which is generally rigidly attached to a respective one of a transversely-spaced pair of hangers 18 and extends rearwardly therefrom to immovably capture axle 28, as will be described in greater detail below. It should be noted that, while hanger 18 is sometimes considered to be part of the vehicle frame or subframe once it is connected to members of the frame or subframe, as described above, the hanger is typically engineered as part of axle/suspension system 320.

Each beam 322 preferably is formed of a fiber-reinforced composite, and is engineered to meet application-specific design requirements, such as spring rate and strength, as known to those skilled in the art of composite design. Each beam 322 includes a reinforcing material, such as glass fibers, carbon fibers, or other known reinforcing materials, which are resistant to tensile stretching. The fibers are dispersed in a polymeric or metallic matrix that is generally flexible, as known in the art of composite material design. Preferably, the fibers are more dimensionally stable than the matrix, which contributes to the advantages of each beam 322, which are described in detail below.

Each beam 322 preferably has a substantially constant cross-section in a transverse direction relative to vehicle frame 12 (FIG. 1), which enables the beams to be manufactured through processes such as pultrusion or extrusion. That is, any cross section of each beam 322 taken along a longitudinal or fore-aft line is substantially the same. Preferably, beams 322 are pultruded, which involves pulling fibers, or a fiber-reinforcing material, through a resin bath and then through a die, as known in art of composite forming. More preferably, beams 322 are pultruded or pulled in a direction that is parallel to axle 28. Pultrusion in this direction provides integral hanger and axle connection areas, as will be described in greater detail below. In addition, pultrusion in this direction is conducive to the orientation of the fibers in each beam 322 in a manner that provides transverse strength, or strength across the entire width of each beam, that is, extending from its outboard side to its inboard side. Such transverse strength in turn increases the transverse stability of beam 202 and thereby improves the roll stability of the beam and thus axle/suspension system 200.

More particularly, pultrusion of each beam 322 in a transverse direction, or in a direction parallel to axle 28, enables the fibers in the beam to be oriented at an angle in a range of from about 0 to about 90 degrees relative to the fore-aft direction of the beam. It is to be noted that the fore-aft direction of each beam 322 is a direction that is generally perpendicular to axle 28. Preferably, a selected percentage of the fibers in beam 322 are oriented at an angle in a range of from about plus or minus 30 degrees to about plus or minus 60 degrees relative to the fore-aft direction of the beam. More preferably, a selected percentage of the fibers in each beam 322 are oriented at an angle of about plus or minus 45 degrees relative to the fore-aft direction of the beam, plus or minus a tolerance of about 15 degrees, which is desirable for optimum transverse strength and thus provides roll stability for second embodiment axle/suspension system 320. In addition, each beam 322 may be formed from a single layer of composite material with fibers at one of or a combination of the above-described orientations. For example, about 25 percent of the fibers in each respective beam 322 may be oriented at an angle of about zero degrees relative to the fore-aft direction of the beam, while another 25 percent of the fibers may be oriented at an at an angle of about plus 45 degrees relative to the fore-aft direction of the beam, yet another 25 percent of the fibers may be oriented at an angle of about plus 90 degrees relative to the fore-aft direction of the beam, and a final 25 percent of the fibers may be oriented at an angle of about minus 45 degrees relative to the fore-aft direction of the beam.

Alternatively, each beam 322 may be formed from multiple laminated layers of composite material. When each beam 322 is formed from multiple laminated layers of material, the layers preferably extend from each respective hanger 18 to axle 28, wrap about the upper, rear and lower surfaces of axle tube 30 and return to the hanger, thereby employing a series of stacked layers to create the structure of the beam, which may desirably increase the strength of the beam. The use of multiple layers enables different fiber orientations in each respective beam 322 to provide strength for the beam in various directions. For example, fibers generally oriented parallel to the direction of axle 28 provide strength during the pultrusion of beam 322 and beaming strength during vehicle operation, while fibers oriented generally perpendicular to the direction of the axle provide fore-aft strength and brake reaction strength, and fibers generally oriented at about 45 degrees to the direction of the axle provide roll stability. Moreover, if desired for a particular application, any of the layers of beam 322 may include fibers oriented at a combination of the above-described orientations, that is, in multiple directions within the same layer. With such construction, each beam 322 generally exhibits spring-like behavior, as will be described in greater detail below.

A central opening 326 and fastener slots 328 (FIG. 12) are formed in a front end 324 of beam 322, as will be described in greater detail below. Front end 324 of beam 322 is secured to hanger 18 under compression in a clamped fashion, as opposed to prior art systems 10, 54, 280, 302, which are secured in a pivoted fashion. To facilitate such clamping, beam front end 324 is disposed under hanger 18 and a beam alignment assembly 330, which also will be described in greater detail below, preferably is aligned with the hanger and attaches beam 332 to the hanger. Alternatively, or as part of beam alignment assembly 330, fasteners, such as bolts 332, may sandwich beam front end 324 in compression when nuts 334 (FIG. 11) each are threadably engaged with and tightened down with intervening washers 338 on a threaded end 336 of a respective one of the bolts. Such construction using beam alignment assembly 330 and/or fasteners 332 allows beam 322 to function as a clamped cantilever spring, as will be described in greater detail below.

Opposite front end 324 of beam 322 is a rear end 340. Rear end 340 of beam 322 is connected to axle 28. To facilitate the connection, layers of composite material 342 firmly encircle and immovably capture axle tube 30 rear end of beam 322. Axle-encircling layers 342 form an integral part of beam 322 when assembled, and shall be referred to hereinbelow for the purpose of convenience as a sleeve. As described above, other composite layers of beam 322 extend from hanger 18 across the upper, rear and lower surfaces of axle tube 30 and return to the hanger, thereby capturing sleeve 342 and the axle tube. Alternatively, sleeve 342 may be formed as an integral structure with the remainder of beam 322. Sleeve 342 is secured to axle tube 30 by an interference fit, adhesive bonding, or mechanical fasteners, such as bolts and/or pins, or a combination thereof. It is to be noted that beam 322 may be formed to immovably capture axle tube 30 without incorporating sleeve 342 into the beam without affecting the overall concept or operation of the invention. A generally triangular shaped cavity 344 may be formed between the front surface of sleeve 342 and the remainder of beam 322, as dictated by structural requirements for forming the beam to capture axle tube 30.

Cavity 344 optionally may remain hollow, be reinforced, or be filled in, depending on the specific design considerations for axle/suspension system 320.

With additional reference now to FIG. 12, to facilitate the mounting of air springs 34, a mounting platform 346 is attached to an upper surface of rear end 340 of beam 322. Platform 346 is formed with front and rear downwardly-extending legs 348, which enable the platform to be seated above and on the curved upper surface of sleeve 342 and secured to beam rear end 340 by bonding or mechanical fasteners, and also is formed with openings 350 to enable attachment of air spring 34 via fasteners (not shown). Since platform 346 is located generally above axle 28, it enables positioning of air spring 34 directly above the axle or generally in vertical alignment with the axle, which reduces the amount of static offset loading encountered by second embodiment axle/suspension system 320. This position of air spring 34 generally in vertical alignment with axle 28 minimizes the resulting moment arm created by the air spring, reducing the forces encountered by second embodiment axle/suspension system 320 of the present invention. In certain applications, it may be desirable to shift the alignment of air spring 34 relative to axle 28, in which case the benefit of force reduction may still be achieved as long as some portion of the air spring is generally in vertical alignment with the centerline of the axle. Of course, in such a case, platform 346 may be modified to position the air spring accordingly. Other components, such as brake air chambers 314 and cam shafts 316 may be mounted directly to axle tube 30 via a bracket 318.

With particular reference now to FIG. 12, beam alignment assembly 330 preferably is used to properly align beams 322 and thus axle/suspension system 320 in relation to frame 12 (FIG. 1). Alignment assembly 330 is more fully described in U.S. patent application Ser. No. 10/966,273, which was filed on Oct. 15, 2004 and is owned by the same assignee as the present invention, Hendrickson USA, L.L.C. Alignment assembly 330 includes a top alignment plate 352, a bottom alignment plate 354, a stepped eccentric cylinder 356, and a primary nut 358.

To generally summarize, top alignment plate 352 seats on top of beam front end 324 and contacts a bottom surface of hanger 18. A plurality of precisely-located bolt holes 360 are formed in top alignment plate 352 and align with corresponding holes 362 formed in hanger 18, thereby providing alignment of the top alignment plate with the hanger. Bolts 332 pass through holes 362 formed in the bottom of hanger 18, through top plate bolt holes 360, through slots 328 formed in beam 322, and through slots 364 formed in bottom alignment plate 354. In this manner, when nuts 334 are tightened on each respective threaded end 336 of bolts 332 with intervening washers 338, top alignment plate 352, beam front end 324 and bottom alignment plate 354 are secured to the hanger, with the beam front end sandwiched between the top and bottom alignment plates. Slotted holes 328 and 364 allow slight movement of beam 322 and bottom alignment plate 354 during the alignment process, thereby enabling proper alignment of the beam structure using eccentric cylinder 356.

To properly align axle/suspension system 320, a stepped opening 366 is formed in top alignment plate 352 and receives eccentric cylinder 356. Eccentric cylinder also passes through central opening 326 formed in beam front end 324 and through a central opening 368 formed in bottom alignment plate 354. Eccentric cylinder 356 cooperates with openings 366, 326, 368 to enable the position of beam 322 to be adjusted by turning a hex shoulder 370 at the bottom of the eccentric cylinder, causing the cylinder to act as a guide pin to secure the position of the beam in both a lateral direction and a fore-aft direction. Primary nut 358, preferably a hex nut, is threaded onto threads 376 formed on a lower end of eccentric cylinder 356 and tightened when the desired position of each respective beam 322 is reached, and nuts 334 may be tightened on bolts 332 to secure the position of the beam and axle/suspension system 320. To maintain the position of primary nut 358 and eccentric cylinder 356, a washer 372 and secondary nut 374 may also be threaded onto the eccentric cylinder and tightened. In this manner, alignment assembly 330 provides a positive mechanical alignment connection by virtue of the positive bearing surface of stepped eccentric cylinder 356.

Second embodiment axle/suspension system 320 provides substantial roll stability. The use of beams 322, each of which are rigidly affixed at their front ends 324 to a respective hanger 18 and thus trailer frame 12, generally operate like fixed cantilever springs. Beams 322 have a certain spring rate, that is, each beam is designed so that it takes a certain amount of force to deflect the beam upwardly and a certain amount of force to deflect the beam downwardly, while being neutral at vehicle ride height. In order for trailer 40 to lean or sway due to roll forces, one of driver's side or curb side axle spindles 32 must move vertically so that it is a different distance away from frame 12 than the transversely opposing curb or driver's side spindle, respectively. The forces that are required to negate this movement can be calculated, enabling each beam 322 to be engineered to include a spring rate that is stiff enough to control such roll or sway. It is to be noted that the spring rate may be used in conjunction with the above-described transverse strength of beam 322 to control roll or sway. Accordingly, since the stiffness of each beam 322 is engineered to be neutral at ride height, air springs 34 are able to provide a soft ride, while the beam works to control sway when vehicle 42 leans.

An additional benefit of beams 322 being neutral at vehicle ride height, which is a term of art in the heavy-duty vehicle industry, is improvement of the life of axle/suspension system 320, particularly with respect to prior art spring suspension 280. More particularly, in prior art spring suspension 280, composite materials have sometimes been used for leaf springs 282, 283 (FIG. 4C), which must support the vertical load of trailer 40 to maintain the vehicle ride height. Since springs 282, 283 of spring suspension 280 must support the weight of trailer 40, the springs experience stress even when the trailer is not loaded with freight. When trailer 40 is fully loaded with freight, springs 282, 283 therefore are highly stressed. Then, as fully-loaded trailer 40 travels over-the-road, potholes, curbs and other impact-related events are encountered, which input more stress to springs 282, 283, which may cause the composite springs to delaminate, which is an internal structural separation of the composite.

In contrast, each beam 322 of second embodiment axle/suspension system 320 preferably is designed to experience stresses in a lower range than prior art spring suspension 280 by being neutral, or generally unstressed, when trailer 40 is unloaded or loaded with freight and the axle/suspension system is maintaining vehicle ride height. By being neutral at ride height for loaded trailer 40, each beam 322 enables air springs 34 to provide optimum ride cushioning. Therefore, when loaded trailer 40 experiences impacts from traveling over-the-road, each beam 322 experiences relatively low stresses, which reduces the fatigue on axle/suspension system 320. Such reduction of stress and fatigue extends the life of each beam 322 and reduces the chances of delamination of the composite beam.

Moreover, the construction of beams 322 and their attachment to each respective hanger 18 and axle 28 may reduce or prevent the type of arcuate motion of beam 20 and the axle as seen in prior art axle/suspension system 10 (FIG. 4) when the hanger moves downwardly, thus potentially reducing or eliminating dock walk. Since beam front end 324 is generally rigidly secured or immovably clamped to hanger 18, each beam 322 behaves in a manner similar to that as described above for beam 202 of first embodiment axle/suspension system 200 to potentially reduce or eliminate dock walk. Likewise, after the fork lift exits trailer 40 and hanger 18 springs upwardly due to the combination of the sudden loss of the weight of the fork lift and the upward force of air spring 34, each beam 322 behaves in a manner similar to that as described above for beam 202 of first embodiment axle/suspension system 200 to potentially reduce or eliminate rearward movement of trailer 40.

It is also important to note that beams 322 reduce undesirable significant downward movement of axle 28. As mentioned above, trailer 40 sometimes is lifted onto a rail car (not shown). With prior art air-ride axle/suspension systems 10, 54, 302, when trailer 40 is lifted, axle 28 moves downwardly until shock absorbers 36 (FIG. 2) are fully extended, which allows for a significant drop of the axle. This drop stretches air bag 66 of air spring 34, which creates a vacuum in the air bag, causing it to fold inwardly. When trailer 40 is placed onto the rail car, folded air bag 66 then is sometimes pinched within air spring 34, potentially damaging the air bag. Beams 322 reduce or prevent this vacuum fold-in effect, since they have a stiffness that builds resistance as they move downwardly, and thereby resist significant downward movement of axle 28. This resistance to downward movement of axle 28 contributes to the potential elimination of shock absorbers 36, since the need for a positive lower stop is eliminated.

These aspects of second embodiment axle/suspension system 320 are different from prior art axle/suspension system 10, which includes a rigid structure that is designed to generally prevent movement of axle spindle 32 associated with roll or sway, but then uses discrete components such as bushing assembly 24 to provide a predictable amount of compliance, which enables control of roll forces. Second embodiment axle/suspension system 320 also is different from parallelogram suspensions 54, 302 which pivot freely, enabling sway, but then use a discrete roll bar component 70, 308 to resist the movement associated with roll or sway. Second embodiment axle/suspension system 320 is different from prior art spring suspension 280 as well, since that system utilizes stiff springs 282, 283 to resist sway, which also carry the load and are therefore too stiff to provide a cushioned ride when vehicle 42 is only lightly loaded.

Also, there is less side-to-side movement with second embodiment axle/suspension system 320 than with prior art parallelogram linkage connections 54, 302. Using parallelogram axle/suspension system 54 as an example, each link 56 of the prior art parallelogram linkage connection requires two pivot connections, that is, four pivot connections for each of the driver's side and curb side suspension assemblies. With one driver's side suspension 54 and one curb side suspension, there are eight total pivot connections, all of which need clearance to rotate. This clearance results in lateral movement of parallelogram axle/suspension system 54. Second embodiment axle/suspension system 320, in contrast, includes no such pivoted connections, thereby eliminating the lateral movement associated with the clearance for such connections. In addition, by eliminating such prior art pivoted connections, second embodiment axle/suspension system 320 also eliminates the angular lateral movement associated with those connections. As a result, second embodiment axle/suspension system 320 accomplishes both roll stability and a reduction in dock walk in a manner that is simplified and improved over prior art axle/suspension systems 10, 54, 280, 302.

Moreover, since beams 322 preferably are formed of a composite material with a constant cross-section, which allows the beams to be pultruded or extruded, second embodiment axle/suspension system 320 may be manufactured more economically than systems of the prior art. The use of a composite material to form beams 322 also leads to a desirable reduction in weight over prior art systems 10, 54, 280, 302 that use heavier steel components. Use of a composite material for beams 322 also increases the resistance to corrosion of second embodiment axle/suspension system 320. It is understood that, while reference to a fiber-reinforced composite for beams 322 has been made above, other types of composite materials may be employed without affecting the overall concept or operation of the invention, such as particle-reinforced composites and structural composites such as laminates, including combinations thereof, and any type of matrix and dispersed phase or filler as known in the composite material art.

It is to be understood that the illustrated structure of each beam 322 is by way of example, as the configuration of the beams can be adjusted to achieve desired performance characteristics and force distribution needed for a particular application. For example, each beam 322 may be arranged to form a truss structure or other frame-type structure. Also, while a pair of suspension assemblies 321 and respective beams 322 are shown, second embodiment axle/suspension system 320 may include a single beam that extends transversely across a substantial amount of the length of axle tube 30, thereby requiring only one beam, rather than two separate beams and suspension assemblies. Further advantages of second embodiment axle/suspension system 320 will be described below, including resisting downward movement to eliminate the need for shock absorbers, enabling quicker inflation for air springs 34, providing a visual ride-height check, reducing lateral movement and allowing the air springs to provide optimum ride cushioning.

Figure 13:
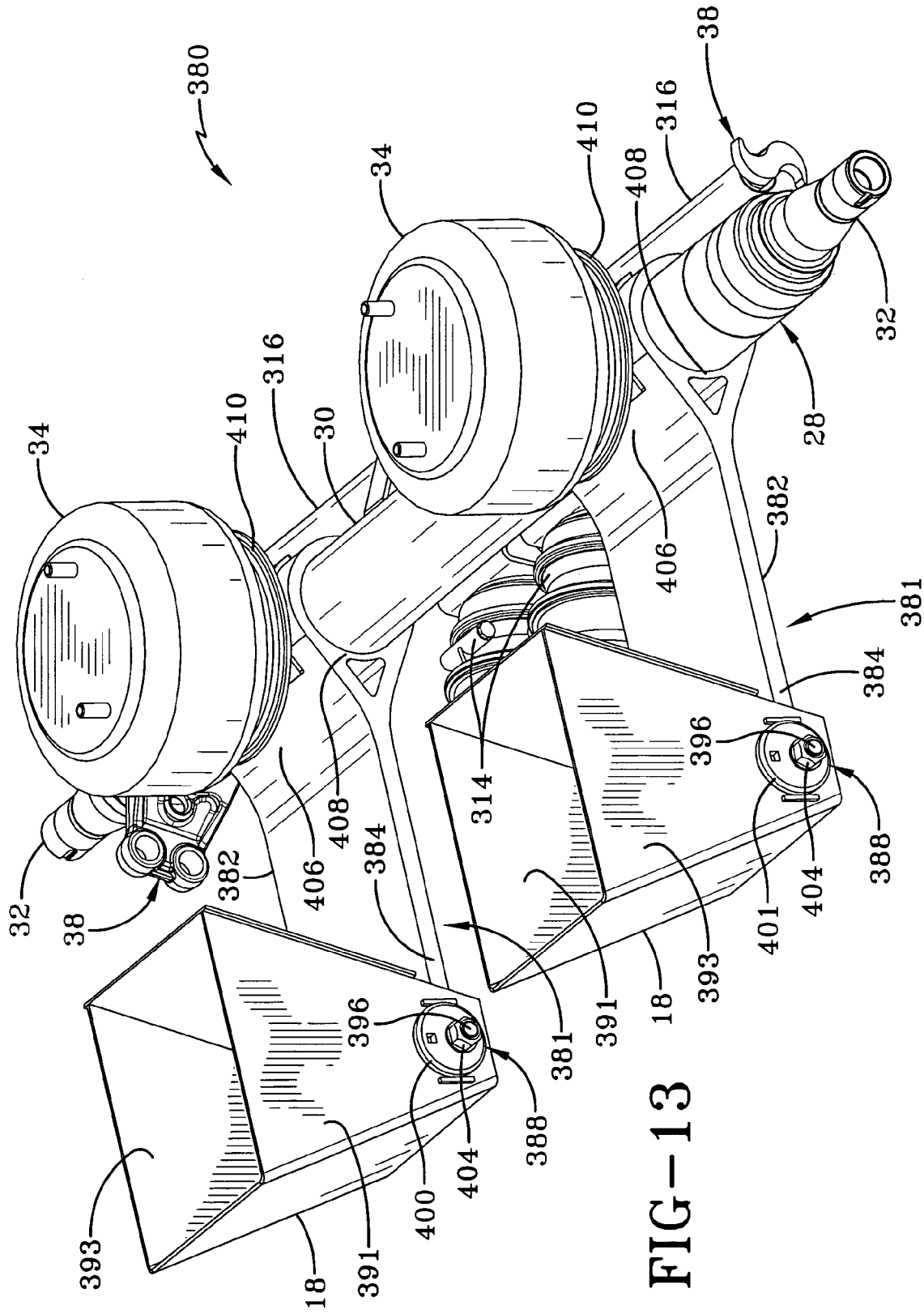
FIG. 13 is a driver's side front top perspective view of a third embodiment of the heavy-duty vehicle axle/suspension system of the present invention, shown attached to vehicle frame hangers and including certain brake components.
Figure 14:
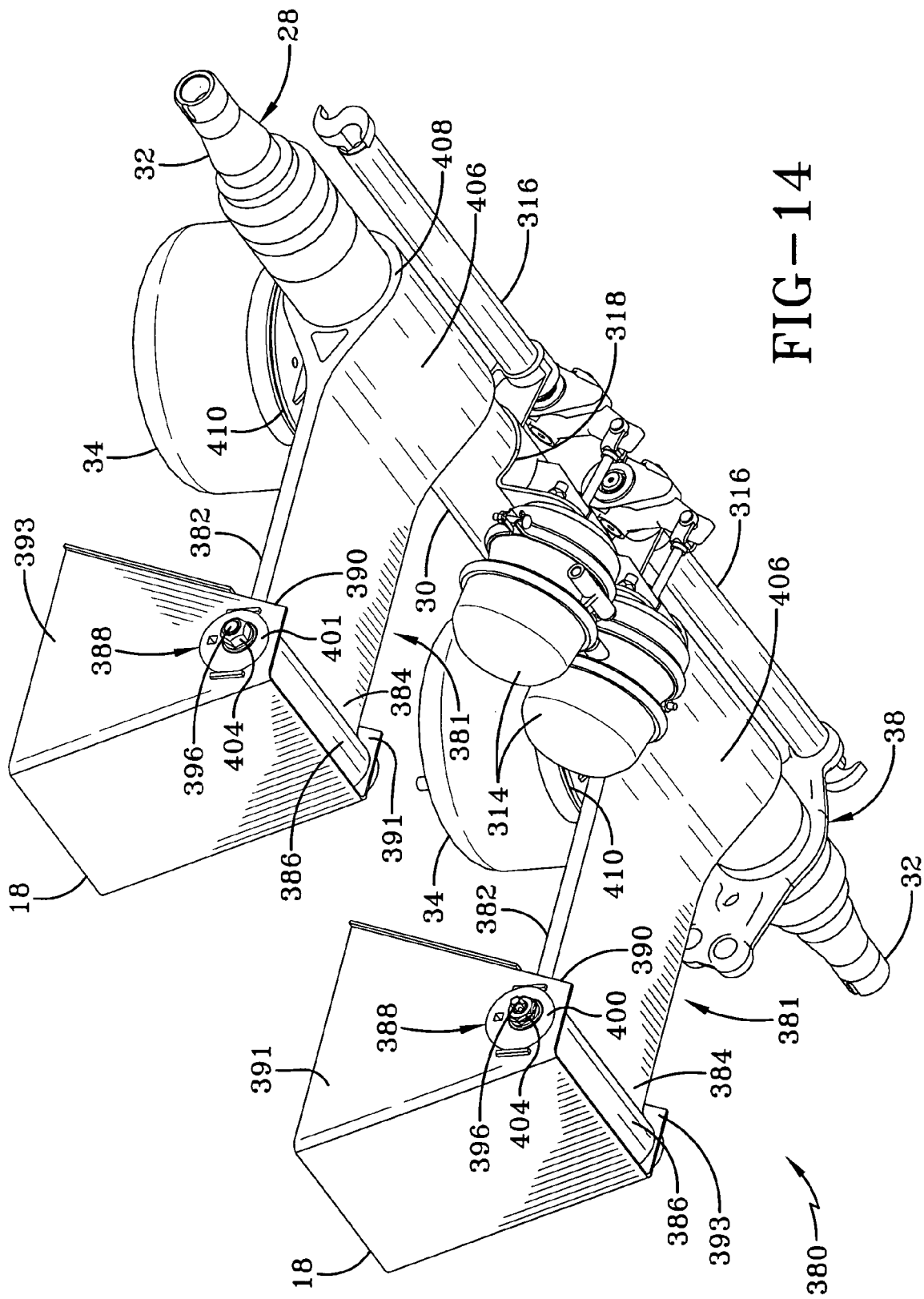
FIG. 14 is a driver's side front bottom perspective view of the heavy-duty vehicle axle/suspension system and hangers shown in FIG. 13.
Figure 15:
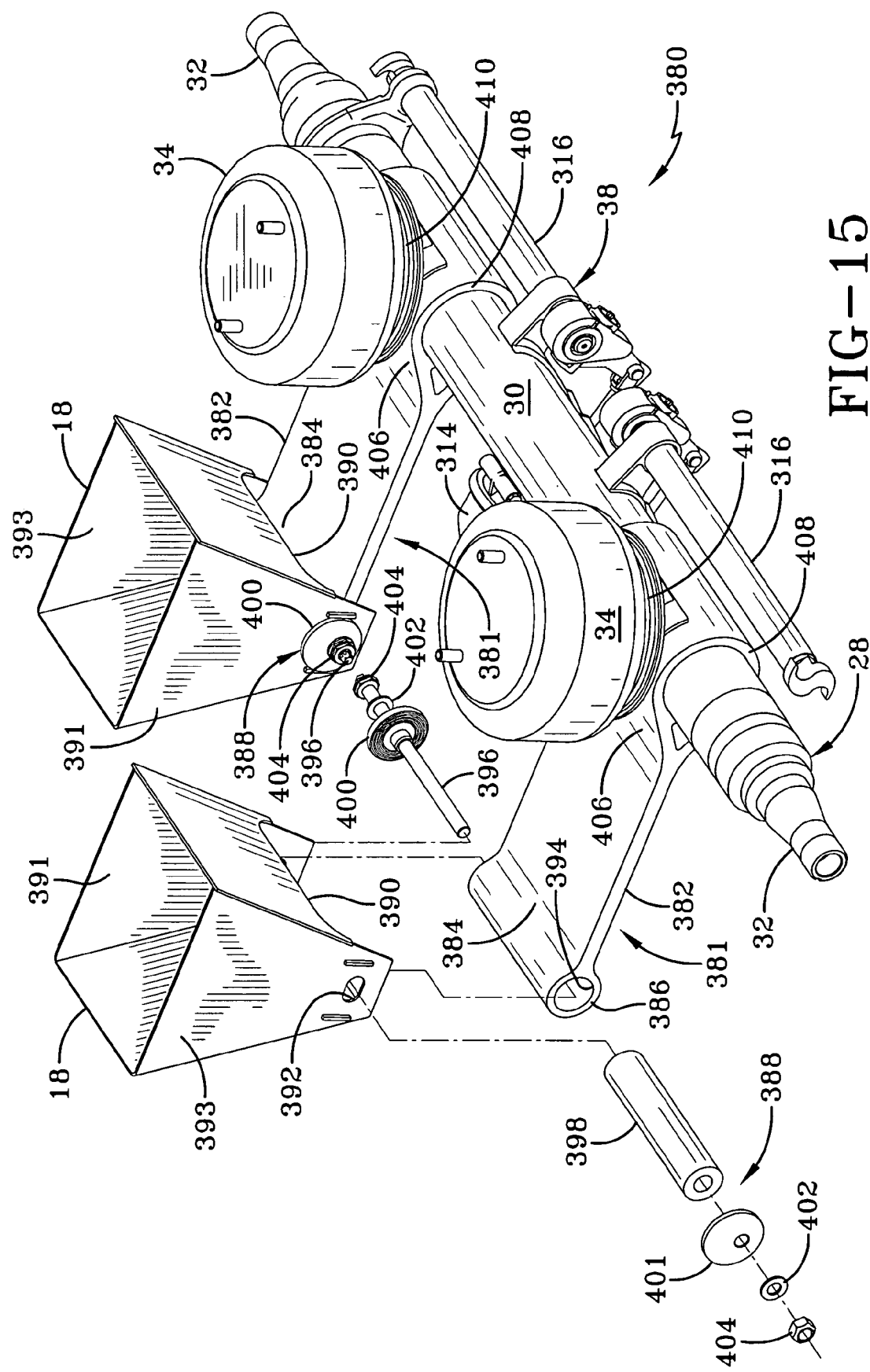
FIG. 15 is a driver's side rear top perspective view of the heavy-duty vehicle axle/suspension system and hangers shown in FIG. 13, with one pivot bushing assembly and hanger shown in exploded form and another pivot bushing assembly and hanger shown in assembled form.

Turning now to FIGS. 13-15, a third embodiment of an axle/suspension system of the present invention is indicated generally at 380, and is useful in vehicle 42. It is understood that axle/suspension system 380 includes a generally identical pair of trailing arm suspension assemblies 381, each one of which is disposed on a respective one of the driver's side and passenger side of vehicle 42. Inasmuch as each suspension assembly 381 is generally identical to the other, only one will be described herein. Third embodiment axle/suspension system 380 generally is similar in structure to second embodiment axle/suspension system 320, with the exception that the third embodiment axle/suspension system includes a pivot connection to hanger 18. As a result, only the differences between third embodiment axle/suspension system 380 and second embodiment axle/suspension system 320 now will be described in detail.

More particularly, with reference to FIGS. 13 and 14, in some applications it may be desirable to utilize a pivot connection to hanger 18 rather than the rigid connection described above for first and second embodiments axle/suspension system 200, 320. Therefore, each suspension assembly 381 of third embodiment axle/suspension system 380 includes a beam 382 having a front end 384 formed with a cylindrical member 386 that accepts a bushing assembly 388. Cylindrical member 386 preferably is integrally formed as a part of beam 382, or may be formed separately and affixed to the beam by bonding or mechanical fasteners, as known in the art of composite joining.

Turning to FIGS. 14 and 15, each hanger 18 is formed with a lower rear opening 390, which receives beam front end 384 and thus beam cylindrical member 386. Hanger 18 also is formed with openings 392 in each of its respective inboard and outboard sidewalls 391 and 393, respectively, which align with a continuous opening 394 formed in cylindrical member 386 when beam front end 384 is received by hanger rear opening 390. To connect beam front end 384 to hanger 18, bushing assembly 388 preferably includes rigid tube 398 that is slip-fit in cylindrical member opening 394. Alternatively, tube 398 may be formed with an elastomeric material on its outer circumference, which is press-fit in opening 394 and/or bonded to the inner wall of cylindrical member 386. Tube 398 in turn receives a bolt 396 that extends through the pivot bushing, hanger sidewall openings 392, a spacer 400, an eccentric alignment member 401 that optionally is used to align the bushing assembly as known in the art, and washers 402. A respective one of nuts 404 threadably engages each end of bolt 396 to secure the above-described components of bushing assembly 388, and thus the pivotal connection between beam 382 and hanger 18.

Returning to FIGS. 13 and 14, the connection of beam 382 of third embodiment axle/suspension system 380 to axle 28 is the same as described above for second embodiment axle/suspension system 320. That is, a sleeve 408 that immovably captures axle tube 30 is formed at a rear end 406 of beam 382, and composite layers of the beam extend from hanger 18 rearwardly to and generally wrap about the upper, rear and lower surfaces of the sleeve to capture it, and then return to the hanger. Also as in second embodiment axle/suspension system 320, third embodiment axle/suspension system 380 includes a platform 410 that is affixed to beam rear end 406 for supporting air spring 34 above and generally in vertical alignment with axle 28.

Third embodiment axle/suspension system 380 provides substantial roll stability in a manner that is similar in some respects, but different in other respects to second embodiment axle/suspension system 320. More particularly, beams 382 are pivotally connected to hangers 18 and thus trailer frame 12, rather than being rigidly connected. However, each beam 382 has a certain predetermined transverse stiffness to control roll or sway. In order for trailer 40 to lean or sway due to roll forces, one of driver's side or curb side axle spindles 32 must move vertically so that it is a different distance away from frame 12 than the transversely opposing curb or driver's side spindle, respectively. The forces that are required to negate this movement can be calculated, enabling each beam 382 to be engineered to include a transverse stiffness that is adequate to control such roll or sway. Accordingly, since the stiffness of each beam 382 is engineered to be neutral at ride height, air springs 34 are able to provide a soft ride, while the beam works to control sway when vehicle 42 leans.

These aspects of third embodiment axle/suspension system 380 are different from prior art axle/suspension system 10, which includes a rigid structure that is designed to generally prevent movement of axle spindle 32 associated with roll or sway, but then uses bushing assembly 24 to provide a predictable amount of compliance, which enables control of roll forces, without any predetermined deflection of beams 20. Third embodiment axle/suspension system 380 also is different from parallelogram suspensions 54, 302 which pivot freely, enabling sway, but then use a discrete roll bar component 70, 308 to resist the movement associated with roll or sway. Second embodiment axle/suspension system 320 is different from prior art spring suspension 280 as well, since that system utilizes stiff springs 282, 283 to resist sway, which also carry the load and are therefore too stiff to provide a cushioned ride when vehicle 42 is only lightly loaded.

Also, there is less side-to-side movement with third embodiment axle/suspension system 380 than with prior art parallelogram linkage connections 54, 302. Using parallelogram axle/suspension system 54 as an example, each link 56 of the prior art parallelogram linkage connection requires two pivot connections, that is, four pivot connections for each of the driver's side and curb side suspension assemblies. With one driver's side suspension 54 and one curb side suspension, there are eight total pivot connections, all of which need clearance to rotate. This clearance results in lateral movement of parallelogram axle/suspension system 54. Third embodiment axle/suspension system 320, in contrast, includes two pivoted connections, thereby reducing the lateral movement associated with the clearance for such connections. In addition, by reducing such prior art pivoted connections, third embodiment axle/suspension system 380 also reduces the angular lateral movement associated with those connections. As a result, third embodiment axle/suspension system 380 accomplishes roll stability in a simplified manner that is improved over prior art axle/suspension systems 10, 54, 280, 302.

Moreover, since beams 382 preferably are formed of a composite material with a constant cross-section, which allows the beams to be pultruded or extruded, third embodiment axle/suspension system 380 may be manufactured more economically than systems of the prior art. The use of a composite material to form beams 382 also leads to a desirable reduction in weight over prior art systems 10, 54, 280, 302 that use heavier steel components. Use of a composite material for beams 382 also increases the resistance to corrosion of third embodiment axle/suspension system 380. It is understood that, while reference to a fiber-reinforced composite for beams 382 has been made above, other types of composite materials may be employed without affecting the overall concept or operation of the invention, such as particle-reinforced composites and structural composites such as laminates, including combinations thereof, and any type of matrix and dispersed phase or filler as known in the composite material art.

In accordance with one of the important features of the present invention, each one of axle/suspension systems 200, 320, 380 is roll stable. Unlike prior art parallelogram and spring systems 54, 280, 302 (FIGS. 5A-5C) that use pivoted links 56, 304, 306, auxiliary roll bars 70, 308, or stiff springs 282, 283 to reduce arcuate motion of axle 28 and control roll, axle/suspension system of the present invention 200, 320, 380 incorporates the ability to control roll stability without the use of such components. First and second embodiments of axle/suspension system 200, 320 also eliminate the hanger pivot connections, which may be susceptible to undesirable conditions such as component wear, loosening of fittings, potential bushing failure, hanger wear-through and high maintenance, and promote the elimination of shock absorbers 36. Third embodiment axle/suspension system 380, through the use of beam 380 which is able to deflect, reduces reliance on the hanger pivot connection, in turn reducing such undesirable conditions associated with prior-art hanger pivot connections.

First and second embodiment axle/suspension systems of the present invention 200, 320 may each act as a clamped cantilever spring that moves generally vertically to potentially reduce or eliminate the type of arcuate motion of beam 20 and axle 28 as seen in prior art axle/suspension system 10 (FIG. 4) caused by vertical movement of frame hanger 18 when a forklift drives into trailer 40. More particularly, first and second embodiments axle/suspension system 200, 320 each include a beam 202, 322, respectively, which is fixed to vehicle frame 12 and may not respond to loading by causing axle 28 to move arcuately in the manner of prior art system 10. Beams 202, 322 each generate a parallelogram geometry as hanger 18 moves up and down, thereby causing movement of axle 28 in a generally vertical manner, rather than arcuately as seen in prior art axle/suspension system 10, thereby potentially reducing or eliminating both dock walk and rearward movement of trailer 40.

Also, prior art parallelogram systems 54, 302 require a suitable wear surface for links 56, 304, 306 and an adequate bushing for the connection between each link and hanger 18, and for the connection between each corresponding link and bracket 62. First and second embodiment axle/suspension systems 200, 320 instead allow the stiffness of respective beams 202, 322 to be tuned for roll stability, thus controlling roll forces without expensive hanger pivot bushings, therefore eliminating this and other intricacies of prior art pivoted suspension technology. Third embodiment axle/suspension system 380 reduces the dependency on pivot bushings 400 by allowing the stiffness of beam 382 to be tuned for roll stability to control roll forces.

Moreover, first and second embodiment axle/suspension systems 200, 320 eliminate the four-per-side pivot connections required by each prior art parallelogram system 54, 302, while third embodiment 380 reduces these connections, thereby reducing or eliminating the lateral movement associated with such connections. By reducing or eliminating multiple and complex prior art components, axle/suspension system 200, 320, 380 has longer life and increased durability compared to prior art systems 10, 54, 280, 302. Likewise, the need and associated cost to maintain bushings and pivot components of the prior art also is reduced or eliminated.

In addition, first and second embodiments axle/suspension system 200, 320 increase the likelihood of eliminating shock absorbers, since the movement of axle 28 is defined by the design of respective beam 202, 322, and the hanger attachment for each. Unlike prior art parallelogram suspensions 54, 302, which possibly can rotate downward far enough to damage air spring 34, the design of each beam 202, 322 has a stiffness that builds resistance as it moves downwardly, potentially eliminating the need for a shock absorber to provide a positive downward stop. Each beam 202, 322 also builds resistance as it moves upwardly, thus softening the impact in the case where a large bump causes internal bumper 68 of air spring 34 to hit vehicle frame 12 or a connecting member of the frame. Although this stiffness reduces the effect of the soft ride of air springs 34, it is about one-third to one-half as stiff as prior art spring suspensions 280, providing adequate softness for ride, yet enough stiffness to control roll forces.

Axle/suspension system 200, 320, 380 thus reduces the number of components over that seen in prior art systems 10, 54, 280, 302. With fewer components, axle/suspension system 200, 320, 380 is more economical to manufacture and maintain than prior art systems 10, 54, 280, 302. Fewer components also allow axle/suspension systems 200, 320, 380 to be lighter in weight and longer-lived than prior art systems 10, 54, 280, 302.

In addition, the placement of air springs 34 directly above axle 28, which is enabled by the design of axle/suspension systems 200, 320, 380, reduces the forces encountered by the systems and increases the life of the air springs. More particularly, axle/suspension systems 200, 320, 380 include platforms 226, 346, 410, respectively, each of which is located adjacent to the top of axle 28, thereby enabling positioning of air spring 34 above the axle and generally in vertical alignment with the axle, which reduces the amount of static offset loading encountered by the axle/suspension systems. The reduction of static offset loading in turn reduces the forces encountered by axle/suspension systems 200, 320, 380 and increases the life of air springs 34.

The identical deflection curvature of beams 202, 382 of first and second embodiments axle/suspension system 200, 320, respectively, may enable axle top dead-center point T to remain top dead-center, which may further increase the life of air springs 34 by reducing uneven loading of the air springs. The parallel articulation of first and second embodiments axle/suspension system 200, 320 also reduce the tendency of rear end 46 of trailer 40 to rise during braking while going in reverse, and the corresponding tendency of the trailer rear end to squat during braking while going forward. Such construction of first and second embodiments axle/suspension system 200, 320 reduces or eliminates fore-aft fatigue stresses on the system. Moreover, proper ride height of trailer 40 is visually indicated by straight, horizontal beams 202, 322, 382 of axle/suspension system 200, 320, 380, respectively.

Furthermore, first and second embodiments axle/suspension systems 200, 320 can substantially maintain ride height when trailer 40 is lifted off the ground onto a rail car. In prior air-ride art axle/suspension systems 10, 54, 302 the lifting of trailer 40 causes axles 28 to drop, which stretches air bag 66 (FIG. 2) of air spring 34. Air bag 66 thus is extended, which creates a vacuum in the bag and causes it to fold inwardly. When trailer 40 is set down on the rail car, air bag 66 might then be pinched in air spring 34, possibly damaging the air bag. Because first and second embodiments axle/suspension system 200, 320 of the invention can somewhat maintain ride height, that is, they do not allow axle 28 to significantly drop, they may reduce or eliminate this vacuum fold-in effect and the potential resulting failures of air bag 66. In addition, since shock absorbers 36 are often used to limit downward movement of axle 28 in prior art air-ride axle/suspension systems 10, 54, 302, the shock absorbers may potentially be eliminated because beams 202, 322, respectively, resist downward movement of the axle in first and second embodiments axle/suspension system 200, 320.

Another important feature of first and second embodiments axle/suspension system 200, 320 is that the design of the system makes it possible to utilize each respective axle/suspension system to lift a selected axle 28. Respective beams 202, 322 are biased to urge a selected axle 28 upwardly, so that the selected axle lifts off of the ground when air is dumped from corresponding air bag 66 of air spring 34. When it is desired to lower axle 28, air bag 66 is inflated, and the pressure of the inflated air bag urges the selected axle downwardly against the upward bias of beams 202, 322, to the operational position shown in FIGS. 6 and 10, respectively.

First and second embodiments axle/suspension system 200, 320 also are neutral at vehicle ride height, which improves of the life of the axle/suspension system, particularly with respect to prior art spring suspension 280. More particularly, in prior art spring suspension 280, composite materials have sometimes been used for leaf springs 282, 283 (FIG. 4C), which must support the vertical load of trailer 40 to maintain the vehicle ride height. Since springs 282, 283 of spring suspension 280 must support the weight of trailer 40, the springs experience stress even when the trailer is not loaded with freight. When trailer 40 is fully loaded with freight, springs 282, 283 therefore are highly stressed. Then, as fully-loaded trailer 40 travels over-the-road, potholes, curbs and other impact-related events are encountered, which input more stress to springs 282, 283, which may cause the composite springs to delaminate, which is an internal structural separation of the composite.

In contrast, beams 202, 322 of first and second embodiments axle/suspension system 200, 320, respectively, preferably are designed to experience stresses in a lower range than prior art spring suspension 280 by being neutral, or generally unstressed, when trailer 40 is unloaded or loaded with freight and the axle/suspension system is maintaining vehicle ride height. By being neutral at ride height for loaded trailer 40, beams 202, 322 enable air springs 34 to provide optimum ride cushioning. Therefore, when loaded trailer 40 experiences impacts from traveling over-the-road, beams 202, 322 experience relatively low stresses, which reduces the fatigue on first and second embodiments axle/suspension system 200, 320. Such reduction of stress and fatigue extends the life of beams 202, 322 and reduces the chances of delamination of the composite beams.

Moreover, the use of a composite material for beams 202, 322, 382 increases the resistance to corrosion of axle/suspension systems 200, 320, 380. While reference to a fiber-reinforced composite for beams 202, 322, 382 has been made above, other types of composite materials may be employed without affecting the overall concept or operation of the invention, such as particle-reinforced composites and structural composites such as laminates, including combinations thereof, and any type of matrix and dispersed phase or filler as known in the composite material art.

While the above embodiments of the invention have been described in the context of trailing arm axle/suspension systems, the invention also applies to leading arm axle/suspension systems. Moreover, the invention applies to various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box.

Accordingly, the heavy-duty vehicle axle/suspension system of the present invention is simplified, provides an effective, safe, inexpensive, and efficient structure which achieves all the enumerated objectives, provides for eliminating difficulties encountered with prior-art heavy-duty vehicle axle/suspension systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved heavy-duty vehicle axle/suspension system is constructed, arranged and used, the characteristics of the construction and arrangement, and the advantageous, new and useful results obtained; the new and useful steps, structures, devices, elements, arrangements, parts and combinations, are set forth in the appended claims.

What is claimed is:

1. An axle/suspension system for a heavy-duty vehicle, said vehicle having a frame extending in a longitudinal direction relative to the vehicle, said axle/suspension system being attached to said vehicle frame via at least one hanger, the axle/suspension system comprising:

an axle extending in a transverse direction relative to said vehicle frame; and at least one beam extending in said longitudinal direction, said beam being formed of a composite material and including:
- a first end being connected to said hanger by a connection that provides minimal compliance;
- a second end being immovably attached to and capturing said axle;
- a spring rate that provides sufficient compliance to said axle/suspension system; and
- a substantially constant cross section in said transverse direction relative to said vehicle frame, such that any cross section of said beam taken along a longitudinally-extending line is substantially the same, whereby the beam provides said sufficient compliance to said axle/suspension system and exhibits sufficient strength to control roll forces encountered by said vehicle during operation.

2. The axle/suspension system for a heavy-duty vehicle of claim 1, wherein said beam is generally rigidly connected to said hanger, whereby rotation of a vehicle tire due to movement of said axle is reduced when a cargo transfer vehicle enters said heavy-duty vehicle.

3. The axle/suspension system for a heavy-duty vehicle of claim 1, wherein said beam is pivotally connected to said hanger.

4. The axle/suspension system for a heavy-duty vehicle of claim 1, wherein said beam is formed by pultruding the beam in a direction that is generally parallel to said axle.

5. The axle/suspension system for a heavy-duty vehicle of claim 1, wherein said beam is formed of a fiber-reinforced composite material.

6. The axle/suspension system for a heavy-duty vehicle of claim 5, wherein said fibers are oriented at an angle between about 0 and about 90 degrees relative to a fore-aft direction of said beam.

7. The axle/suspension system for a heavy-duty vehicle of claim 6, wherein said fibers are oriented at an angle between about 30 and about 60 degrees relative to a fore-aft direction of said beam.

8. The axle/suspension system for a heavy-duty vehicle of claim 1, further comprising:
- at least one air spring for cushioning said vehicle frame; and
- means for positioning said air spring above and generally in vertical alignment with said axle.

9. The axle/suspension system for a heavy-duty vehicle of claim 8, wherein said means for positioning said air spring include a platform disposed on said beam second end.

10. The axle/suspension system for a heavy-duty vehicle of claim 1, wherein said beam is neutral at a ride height of said vehicle when said vehicle is loaded with freight.

11. The axle/suspension system for a heavy-duty vehicle of claim 1, wherein said axle/suspension system is aligned relative to said heavy-duty vehicle frame using an alignment assembly disposed at said beam first end.

12. The axle/suspension system for a heavy-duty vehicle of claim 11, wherein said beam defines a first orifice and said alignment assembly comprises:
- at least one alignment plate selected from the group consisting of a top alignment plate disposed above and in abutment with a top surface of said beam, and a bottom alignment plate disposed below and in abutment with a bottom surface of said beam, said alignment plate defining a second orifice; and
- a cylinder received by said first and second orifices, whereby said cylinder position is adjustable relative to said second orifice for aligning said axle/suspension system, said cylinder further acting as a bearing surface for distributing forces acting on said alignment assembly.

13. The axle/suspension system for a heavy-duty vehicle of claim 1, wherein said beam is used to lift said axle off of the ground.

14. The axle/suspension system for a heavy-duty vehicle of claim 1, wherein said connection of said first end of said beam includes a pivot bushing, said pivot bushing providing said minimal compliance.

\* \* \* \* \*